United States Patent
Feirer et al.

(10) Patent No.: US 12,235,429 B2
(45) Date of Patent: Feb. 25, 2025

(54) APPARATUS AND METHOD FOR DETECTING COVERSLIP REGIONS OF A SPECIMEN SLIDE

(71) Applicant: EUROIMMUN MEDIZINISCHE LABORDIAGNOSTIKA AG, Lübeck (DE)

(72) Inventors: Christian Feirer, Lübeck (DE); Erik Bernitt-Ringering, Lübeck (DE); Martin Rateike, Pansdorf (DE); Simon Schwab, Lübeck (DE); Winfried Stöcker, Groß Grönau (DE)

(73) Assignee: EUROIMMUN MEDIZINISCHE LABORDIAGNOSTIKA AG, Lübeck (DE)

( * ) Notice: Subject to any disclaimer, the term of this patent is extended or adjusted under 35 U.S.C. 154(b) by 383 days.

(21) Appl. No.: 17/787,570

(22) PCT Filed: Dec. 17, 2020

(86) PCT No.: PCT/EP2020/086631
§ 371 (c)(1),
(2) Date: Jun. 20, 2022

(87) PCT Pub. No.: WO2021/122888
PCT Pub. Date: Jun. 24, 2021

(65) Prior Publication Data
US 2022/0405940 A1    Dec. 22, 2022

(30) Foreign Application Priority Data

Dec. 20, 2019 (EP) .................................... 19219070

(51) Int. Cl.
*G02B 21/08* (2006.01)
*G02B 21/36* (2006.01)
(Continued)

(52) U.S. Cl.
CPC ......... *G02B 21/088* (2013.01); *G02B 21/367* (2013.01); *G06T 7/13* (2017.01);
(Continued)

(58) Field of Classification Search
CPC .............. G02B 21/088; G06T 7/11–13; G06T 2207/20112
See application file for complete search history.

(56) References Cited

U.S. PATENT DOCUMENTS

| 5,812,692 A | 9/1998 | Rosenlof et al. |
| 7,692,857 B2 | 4/2010 | Knoblich et al. |

(Continued)

FOREIGN PATENT DOCUMENTS

| EP | 1772764 A2 | 4/2007 |
| EP | 1772764 A3 | 5/2007 |

(Continued)

*Primary Examiner* — Wen W Huang
(74) *Attorney, Agent, or Firm* — Bochner PLLC; Andrew Bochner

(57) ABSTRACT

An apparatus is proposed for identifying respective cover slip regions of respective cover slips having respective tissue sections on a specimen slide, which has multiple optical identifiers. The apparatus includes a planar light source, an image acquisition unit, a holding unit for positioning the specimen slide between the planar light source and the image acquisition unit, a slit diaphragm, which has multiple opening slits, reversibly positionable between the planar light source and the specimen slide, and an illumination unit, which is designed to illuminate that surface of the specimen slide which faces toward the image acquisition unit. Furthermore, the apparatus includes a monitoring unit which is designed, on the basis of a completely illuminated transmitted light image, an incident light image, and a partially darkened transmitted light image, to assign respective tissue sections to respective optical identifiers.

10 Claims, 15 Drawing Sheets

Figure 1:
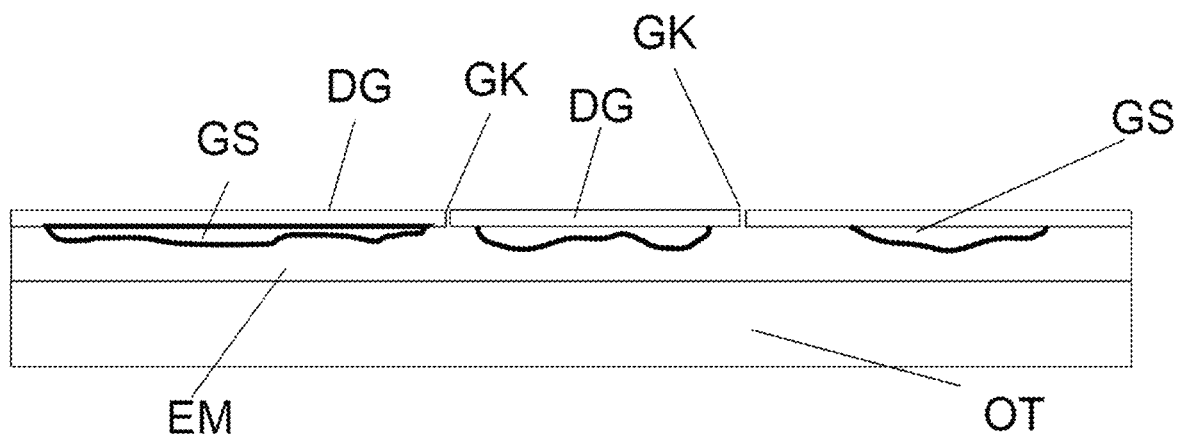

(51) Int. Cl.
  *G06T 7/13* (2017.01)
  *G06V 10/28* (2022.01)
  *G06V 10/50* (2022.01)
  *G06V 20/69* (2022.01)

(52) U.S. Cl.
  CPC ............ *G06V 10/28* (2022.01); *G06V 10/507* (2022.01); *G06V 20/69* (2022.01); *G06T 2207/10056* (2013.01); *G06T 2207/30024* (2013.01)

(56) References Cited

U.S. PATENT DOCUMENTS

| | | | |
|---|---|---|---|
| 2007/0269085 A1 | 11/2007 | Oshiro et al. | |
| 2011/0034348 A1* | 2/2011 | Deutsch | C12M 23/12 506/14 |
| 2012/0002034 A1* | 1/2012 | Matsunobu | G06V 20/69 348/79 |
| 2015/0173952 A1* | 6/2015 | Nomura | A61F 9/008 600/249 |
| 2016/0139387 A1* | 5/2016 | Virk | G02B 21/002 348/79 |
| 2017/0138855 A1 | 5/2017 | Schön et al. | |
| 2020/0003618 A1* | 1/2020 | Fujita | G01N 21/27 |
| 2020/0149875 A1* | 5/2020 | Yamane | G06T 7/70 |
| 2020/0160522 A1* | 5/2020 | Merlo | G02B 21/06 |
| 2021/0199585 A1* | 7/2021 | Tatsuta | G02B 21/0076 |

FOREIGN PATENT DOCUMENTS

| | | |
|---|---|---|
| EP | 2053535 A2 | 4/2009 |
| EP | 2402813 A2 | 1/2012 |
| EP | 2402813 A3 | 3/2012 |
| EP | 2053535 A3 | 6/2012 |

\* cited by examiner

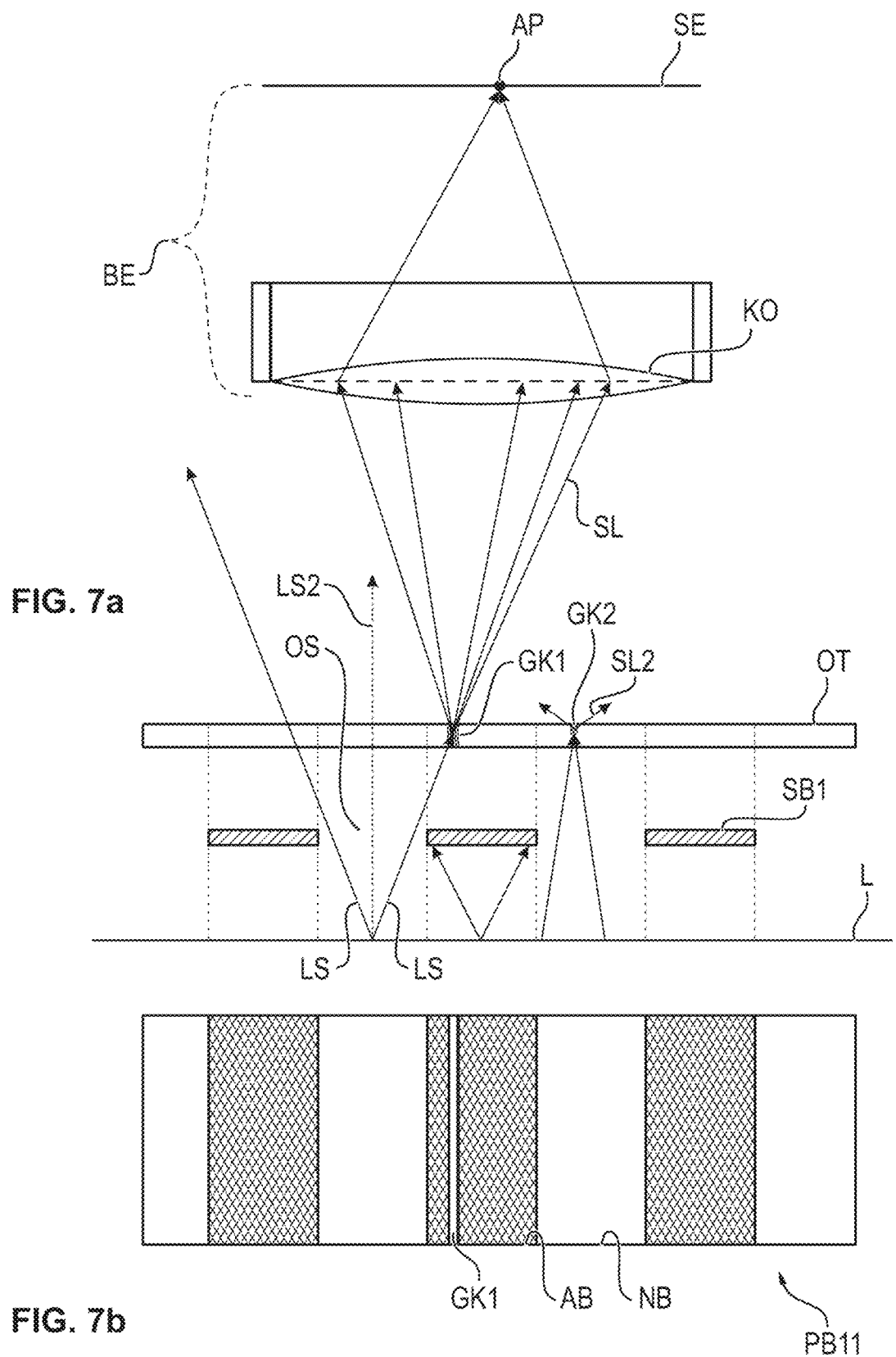

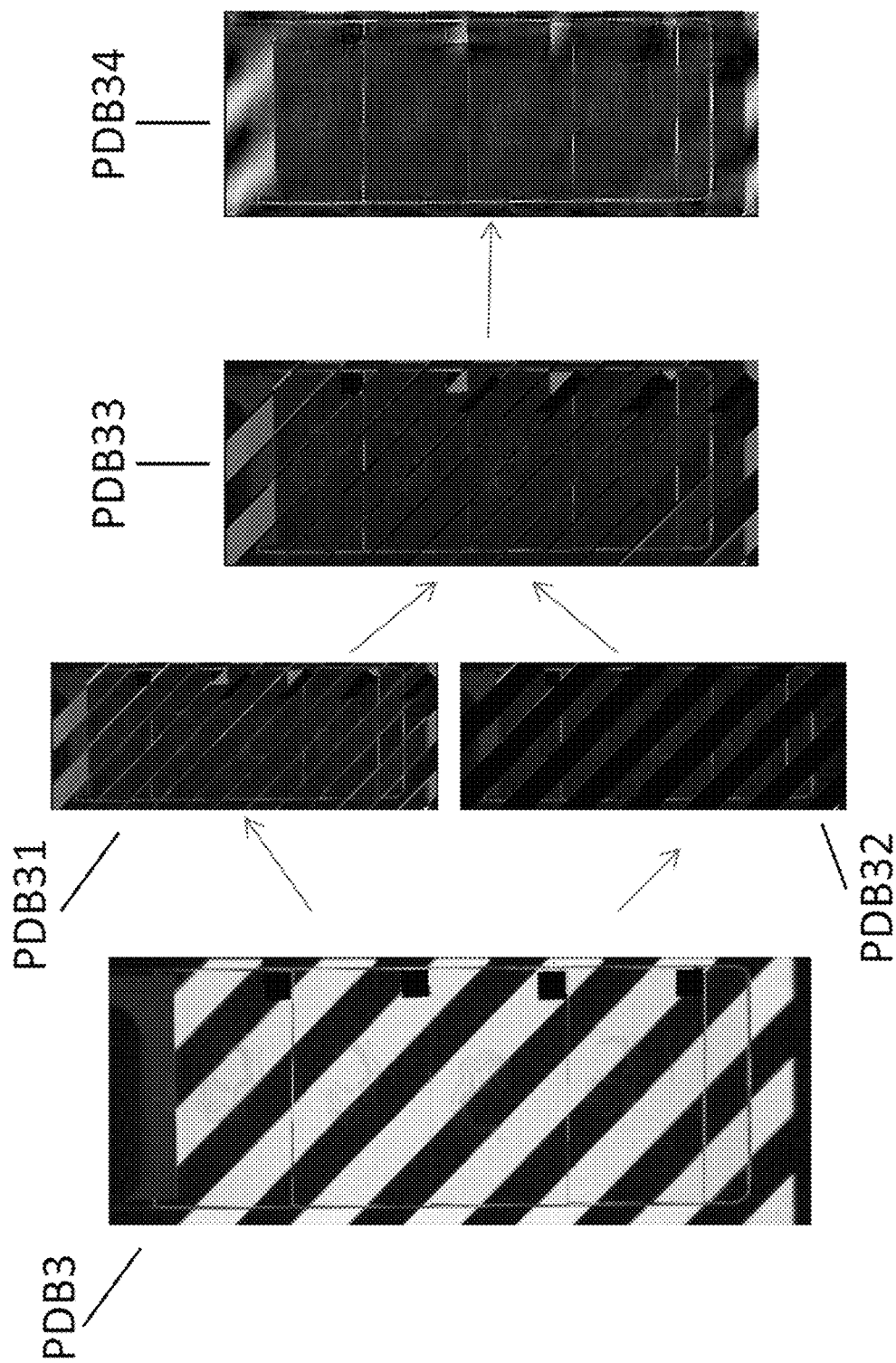

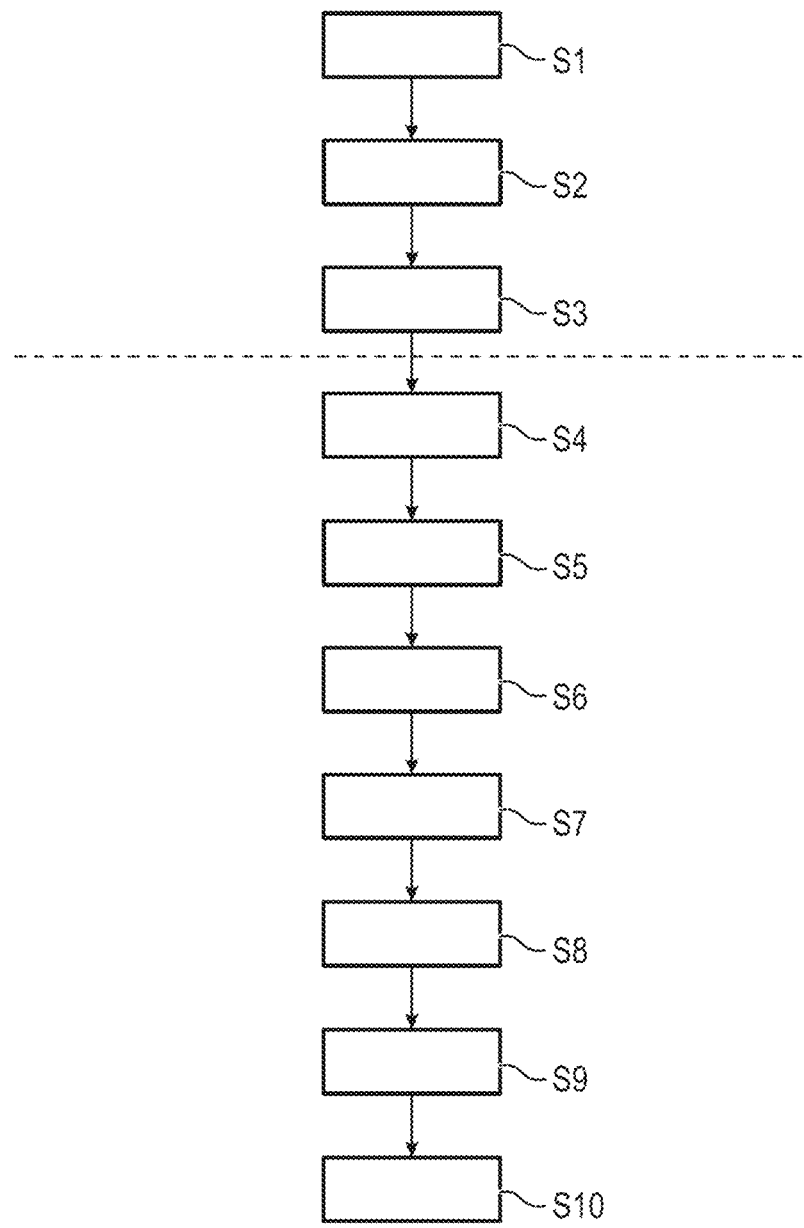

APPARATUS AND METHOD FOR DETECTING COVERSLIP REGIONS OF A SPECIMEN SLIDE

The invention relates to an apparatus, a method, a digital image processing method, a computer-implemented method, a computer program product, and a computing unit for identifying respective cover slip regions of respective cover slips having respective tissue sections on a specimen slide, which has multiple optical identifiers.

In the course of pathological examinations, it is necessary to position tissue sections from patient tissue after so-called staining on a specimen slide and then acquire an image of the tissue via microscopy. Such a specimen slide consists of an optically transparent medium, preferably glass.

In pathology, a single tissue section is typically positioned via a single cover slip on the specimen slide. However, it is also possible that such a specimen slide has not only a single tissue section but multiple tissue sections adjacent to one another, wherein a specific tissue section is positioned via a specific cover slip on the specimen slide. The specimen slide therefore then has multiple cover slips having multiple tissue sections.

In particular, a respective cover slip can then be provided with a respective optical identifier, preferably in the form of a data matrix code. An optical identifier indexes data, which can be in particular patient data. The optical identifier or the optical ID thus enables the corresponding tissue section to be able to be assigned to a specific patient or a specific examination. Furthermore, further items of information can be stored by the optical identifier.

The cover slips or the cover slip regions each have glass edges, so that the cover slip regions are delimited from one another by them. If multiple tissue sections are thus arranged via respective cover slips on a specimen slide and a respective cover slip bears a respective optical identifier, the object is thus to reliably assign respective tissue sections to respective optical identifiers.

After an acquisition of images of the specimen slide, the object thus results of reliably identifying the respective cover slip regions. In other words: for a later evaluation of an image of a specific tissue section and its assignment to a specific patient or a specific examination, it thus first has to be established which tissue section having which cover slip belongs to which optical identifier. The tissue section is then preferably scanned later in the course of a high-resolution microscopy method.

FIG. 1 shows a specimen slide OT, on which respective cover slips DG cover respective tissue sections and correspondingly position them on the specimen slide OT. The cover slips DG each have glass edges GK. For fixing the cover slips and the tissue sections on the slide OT, the specimen slide has a cover medium EM, which is initially liquid upon application of the cover slips DG having the tissue sections GS to the specimen slide OT and then enters a solid state later after positioning of the cover slips DG.

Figure 2:
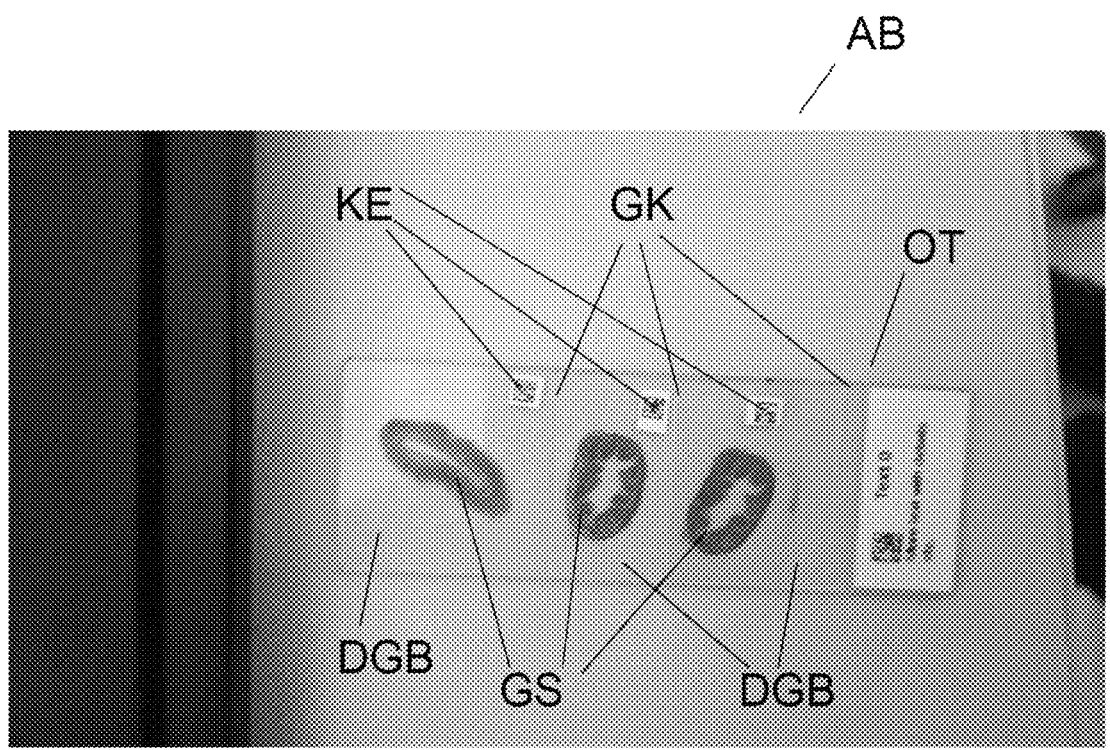

FIG. 2 shows an incident light image AB of a corresponding specimen slide OT, wherein respective cover slip regions DGB having respective tissue sections GS also have respective optical identifiers KE. The cover slip regions DGB are separated from one another by respective glass edges GK.

A detection of a glass edge GK to determine or identify a cover slip region DGB can in principle be possible by evaluating the incident light image AB. However, in general this will require a high level of algorithmic complexity, since the glass edges GK do not significantly stand out in their signal strength from the further regions of the cover slips. In other cases, the signal of the glass edges can be so weak that it is impossible to recognize them.

Figure 3A:
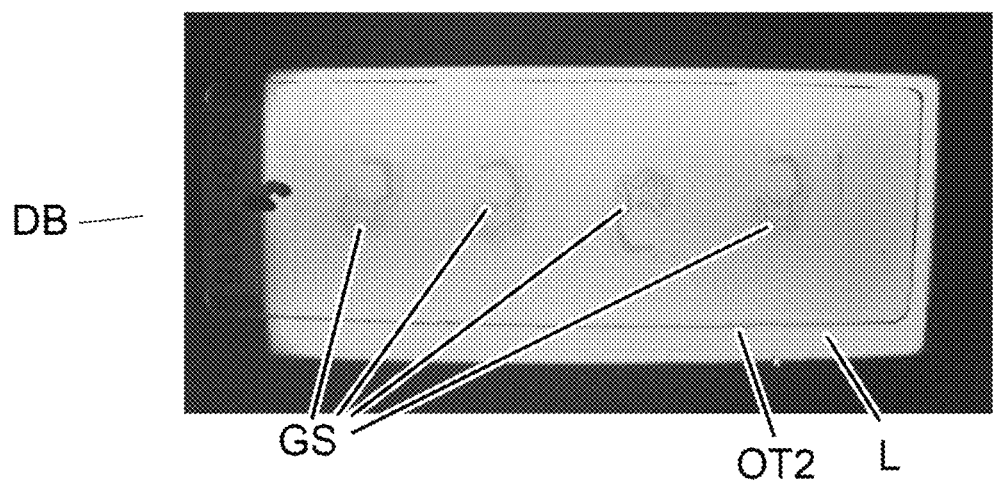

FIG. 3a shows a further, similar specimen slide OT2 in a transmitted light image DB, which was obtained in that the specimen slide OT2 was illuminated by transmission from below by a planar light source L. The tissue sections GS are well visible here. However, existing glass edges of the cover slips are almost not visible, since they do not stand out sufficiently from the further cover slip regions in their signal strength. Only the outer glass edges OGK of the specimen slide OT2 are visible. An identification of the cover slip regions by evaluation of a transmitted light image DB is thus also only possible with difficulty. A cover glass may also be referred to as a carrier glass.

The object of the present invention is thus to be able to spatially and preferably also logically assign respective tissue sections to respective optical identifiers via imaging and image processing on the basis of one image or multiple images of a specimen slide.

The object according to the invention is achieved by the apparatus proposed according to the invention, the method according to the invention, the digital processing method according to the invention, the computer-implemented method according to the invention, the computer program product according to the invention, and the computing unit according to the invention.

An apparatus according to the invention for identifying respective cover slip regions of respective cover slips having respective tissue sections on a specimen slide, which has multiple optical identifiers, is thus proposed. The apparatus includes: a planar light source, an image acquisition unit, a holding unit for positioning the specimen slide between the planar light source and the image acquisition unit, a slit diaphragm, which has multiple opening slits, reversibly positionable between the planar light source and the specimen slide, an illumination unit designed to illuminate that surface of the specimen slide which faces toward the image acquisition unit, and furthermore a control unit. The control unit is designed, in a first operating state, to activate the planar light source and to acquire a completely illuminated transmitted light image of the specimen slide via the image acquisition unit, furthermore, in a second operating state, to activate the illumination unit and to acquire an incident light image of the specimen slide via the image acquisition unit, furthermore, in a third operating state, to actuate the slit diaphragm in such a way that the slit diaphragm is positioned between the planar light source and the specimen slide, and to activate the planar light source and to acquire a partially darkened transmitted light image of the specimen slide via the image acquisition unit. The control unit is furthermore designed to assign respective tissue sections to respective optical identifiers on the basis of the completely illuminated transmitted light image, the incident light image, and the partially darkened transmitted light image. The respective tissue sections are preferably spatially and in particular also logically assigned to the respective optical identifiers.

Advantageous embodiments of the invention are the subject matter of the dependent claims and are explained in more detail in the following description, partially with reference to the figures.

The control unit is preferably furthermore designed to determine respective spatial positions of respective optical identifiers on the basis of the incident light image, furthermore to determine respective spatial locations of the respective cover slip regions on the basis of the partially darkened transmitted light image, furthermore to determine respective spatial locations of the respective tissue sections on the basis of the completely illuminated transmitted light image, and to assign the respective tissue sections to the respective optical identifiers on the basis of the respective spatial positions of the respective optical identifiers, on the basis of the respective spatial locations of the respective cover slip regions, and on the basis of the respective spatial locations of the respective tissue sections.

The control unit is preferably furthermore designed to detect potential glass edges of cover slips on the basis of the partially darkened transmitted light image, furthermore to identify actual glass edges of cover slips on the basis of the potential glass edges and on the basis of at least one item of specification information, and furthermore to identify the cover slip regions on the basis of the actual glass edges.

The slit diaphragm is preferably a first slit diaphragm, wherein the partially darkened image is a first partially darkened image, wherein the apparatus furthermore includes a second slit diaphragm, which has multiple opening slits, reversibly positionable between the planar light source and the specimen slide, wherein the control unit is furthermore designed, in a fourth operating state, to actuate the second slit diaphragm in such a way that the second slit diaphragm is positioned between the planar light source and the specimen slide, and to activate the planar light source and to acquire a second partially darkened transmitted light image of the specimen slide via the image acquisition unit and furthermore to determine the respective spatial locations of the respective cover slip regions on the basis of the partially darkened transmitted light images.

The apparatus preferably furthermore includes a third slit diaphragm, which has multiple opening slits, reversibly positionable between the planar light source and the specimen slide, wherein the control unit is furthermore designed, in a fifth operating state, to actuate the third slit diaphragm in such a way that the third slit diaphragm is positioned between the planar light source and the specimen slide and to activate the planar light source and to acquire a third partially darkened transmitted light image of the specimen slide via the image acquisition unit and furthermore to determine the respective spatial locations of the respective cover slip regions on the basis of the partially darkened transmitted light images.

In the first operating state, the reversibly positionable slit diaphragm is preferably not positioned between the planar light source and the specimen slide.

Furthermore, a method according to the invention is proposed. The method according to the invention for identifying respective cover slip regions of respective cover slips having respective tissue sections on a specimen slide, which has multiple optical identifiers, has different steps: positioning the specimen slide between a planar light source and an image acquisition unit, providing a reversibly positionable slit diaphragm, which has multiple opening slits, between the planar light source and the specimen slide, providing an illumination unit designed to illuminate that surface of the specimen slide which faces toward the image acquisition unit, furthermore, in a first operating state, activating the planar light source and acquiring a completely illuminated transmitted light image of the specimen slide via the image acquisition unit, furthermore, in a second operating state, activating the illumination unit and acquiring an incident light image of the specimen slide via the image acquisition unit, furthermore, in a third operating state, actuating the slit diaphragm in such a way that the slit diaphragm is positioned between the planar light source and the specimen slide, and furthermore activating the planar light source and acquiring a partially darkened transmitted light image of the specimen slide via the image acquisition unit, assigning respective tissue sections to respective optical identifiers on the basis of the completely illuminated transmitted light image, the incident light image, and the partially darkened transmitted light image.

The method preferably includes the following steps: determining respective spatial positions of respective optical identifiers on the basis of the incident light image, furthermore determining respective spatial locations of the respective cover slip regions on the basis of the partially darkened transmitted light image, furthermore determining respective spatial locations of the respective tissue sections on the basis of the completely illuminated transmitted light image, and assigning the respective tissue sections to the respective optical identifiers on the basis of the respective spatial positions of the respective optical identifiers, on the basis of the respective spatial locations of the respective cover slip regions, and on the basis of the respective spatial locations of the respective tissue sections.

The method preferably includes the following steps: detecting potential glass edges of cover slips on the specimen slide on the basis of the partially darkened transmitted light image, identifying actual glass edges on the basis of the potential glass edges and on the basis of at least one item of specification information, and furthermore identifying the cover slip regions on the basis of the actual glass edges.

The slit diaphragm is preferably a first slit diaphragm, wherein the partially darkened image is a first partially darkened image, wherein the method preferably furthermore includes the following steps: providing a second slit diaphragm, which has multiple opening slits, reversibly positionable between the planar light source and the specimen slide, and furthermore, in a fourth operating state, actuating the second slit diaphragm in such a way that the second slit diaphragm is positioned between the planar light source and the specimen slide, and furthermore activating the planar light source and acquiring a second partially darkened transmitted light image of the specimen slide via the image acquisition unit, and furthermore determining the respective spatial locations of the respective cover slip regions on the basis of the partially darkened transmitted light images.

Furthermore, a digital image processing method for identifying respective cover slip regions of respective cover slips having respective tissue sections on a specimen slide, which has multiple optical identifiers, is proposed. The digital image processing method includes the following steps: providing a completely illuminated transmitted light image of the specimen slide, providing an incident light image of the specimen slide, providing a partially darkened transmitted light image of the specimen slide, and assigning respective tissue sections to respective optical identifiers on the basis of the completely illuminated transmitted light image, the incident light image, and the partially darkened transmitted light image.

Furthermore, a computer-implemented method for identifying respective cover slip regions of respective cover slips having respective tissue sections on a specimen slide, which has multiple optical identifiers, is proposed, including the following steps: providing a completely illuminated transmitted light image of the specimen slide, providing an incident light image of the specimen slide, providing a partially darkened transmitted light image of the specimen slide, and assigning respective tissue sections to respective optical identifiers on the basis of the completely illuminated transmitted light image, the incident light image, and the partially darkened transmitted light image.

Furthermore, a computer program product is proposed, comprising commands which, upon the execution of the program by a computer, cause it to carry out the computer-implemented method.

Furthermore, a computing unit for identifying respective cover slip regions of respective cover slips having respective tissue sections on a specimen slide, which has multiple optical identifiers, is proposed. The computing unit is designed to: provide a completely illuminated transmitted light image of the specimen slide, provide an incident light image of the specimen slide, provided a partially darkened transmitted light image of the specimen slide, and assign respective tissue sections to respective optical identifiers on the basis of the completely illuminated transmitted light image, the incident light image, and the partially darkened transmitted light image.

Figure 3B:
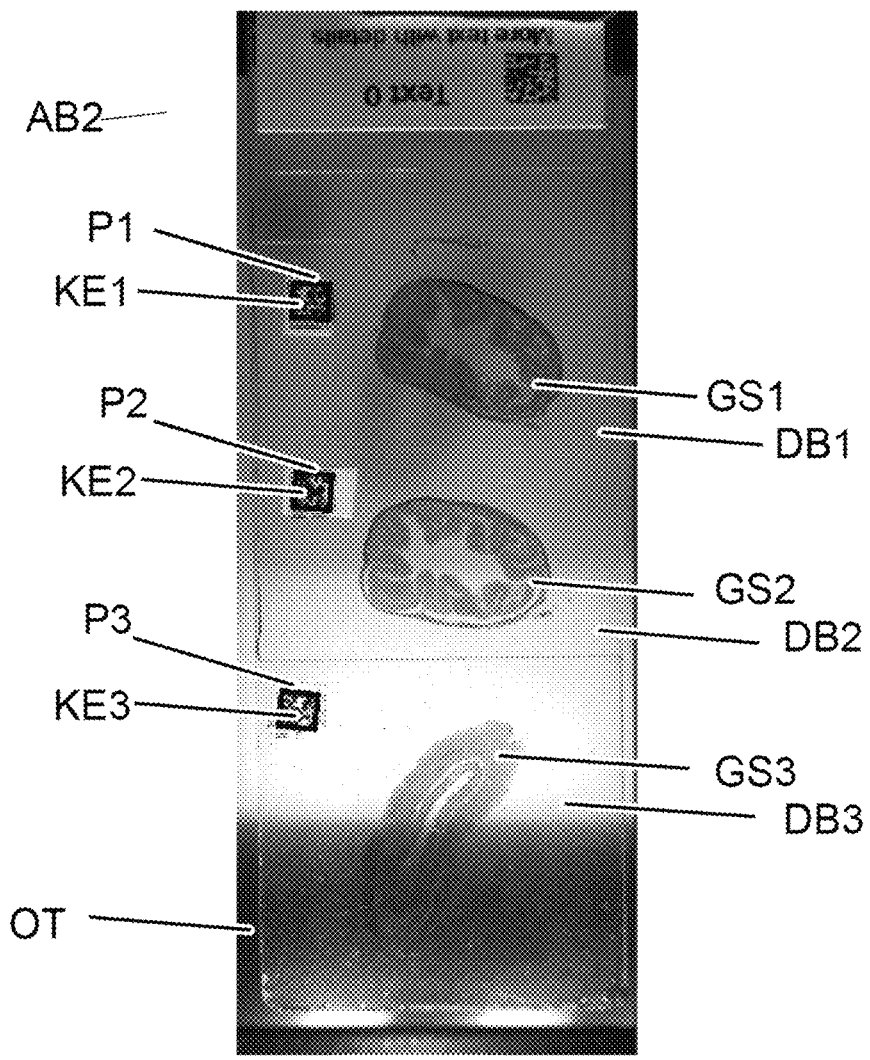
Figure 4:
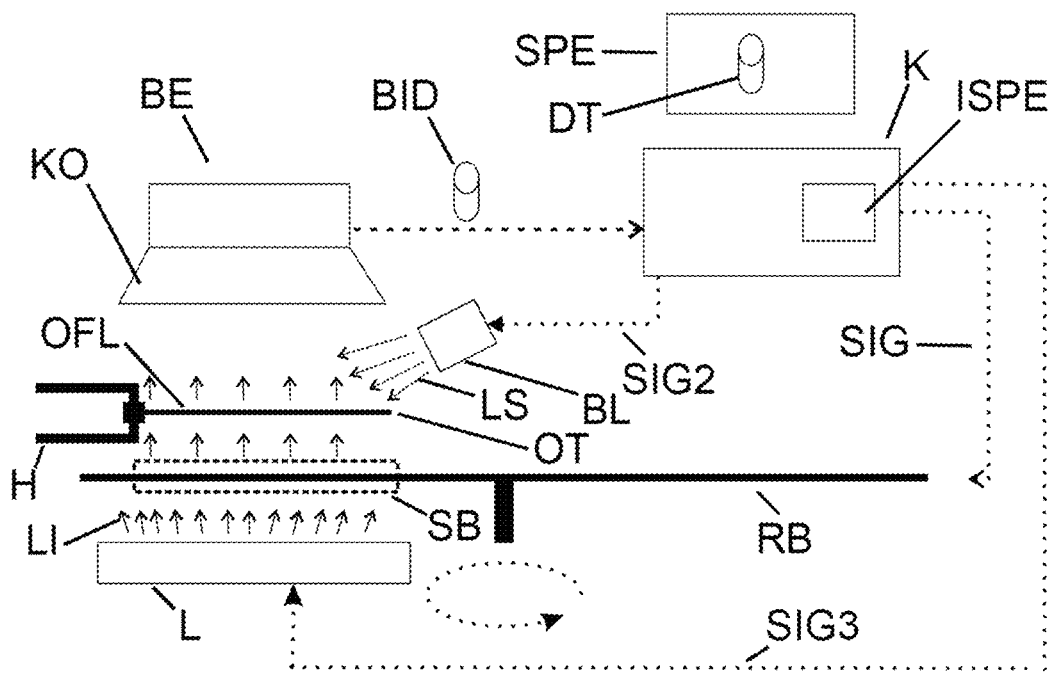
Figure 5:
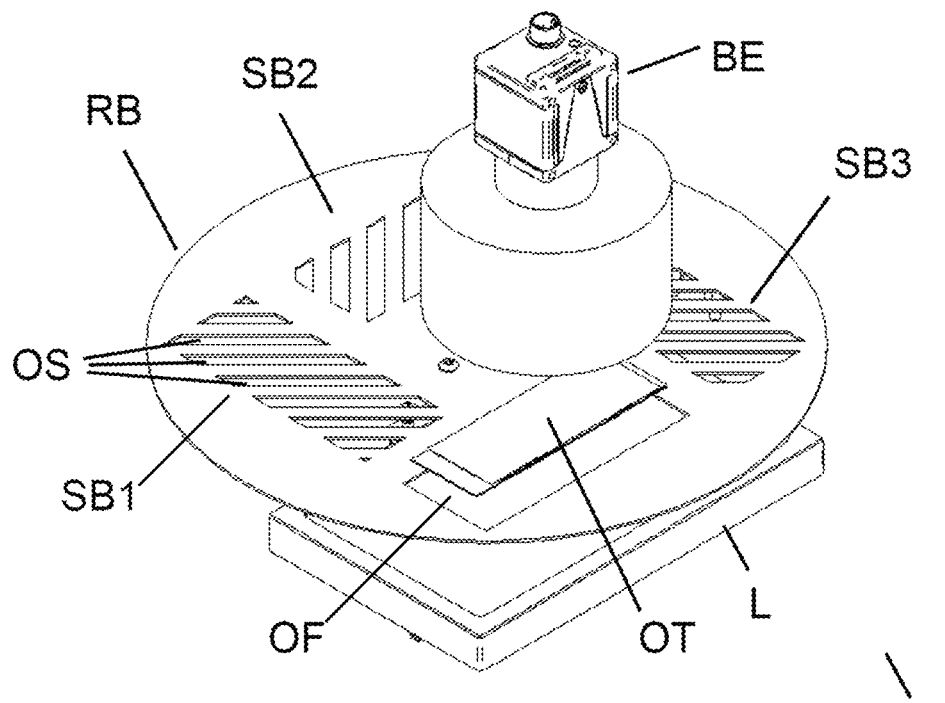
Figure 6:
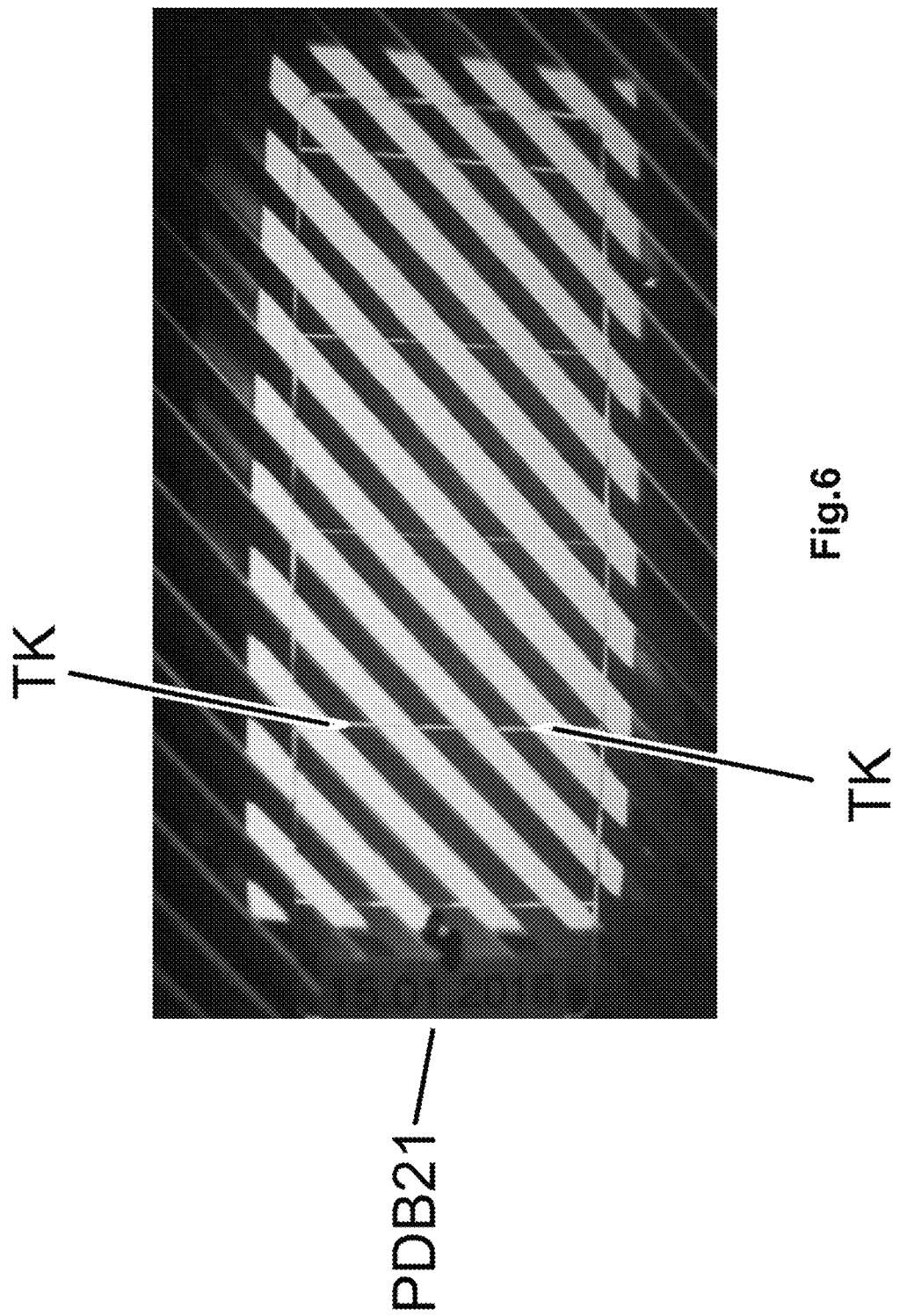
Figure 8A:
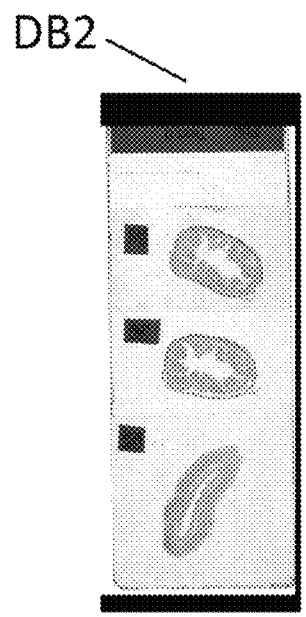
Figure 8B:
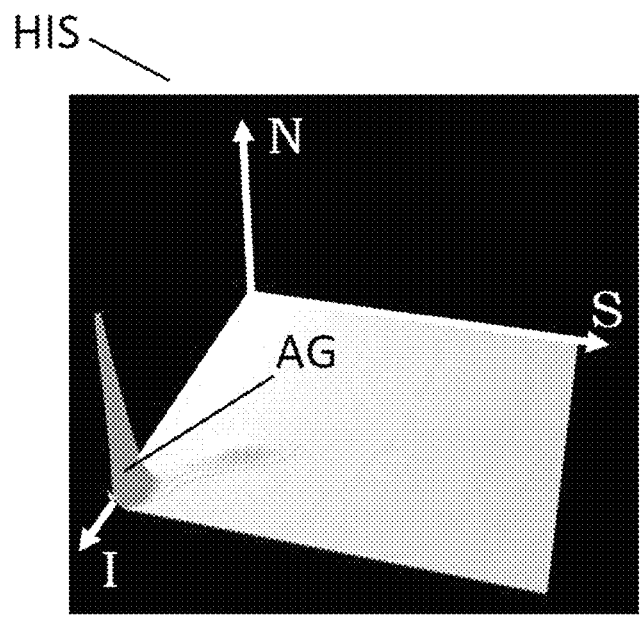
Figure 8C:
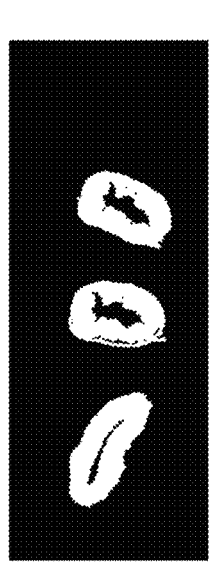
Figure 8D:
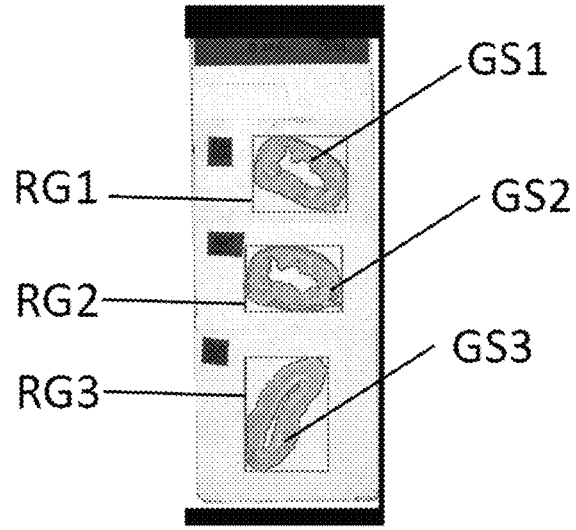
Figure 10C:
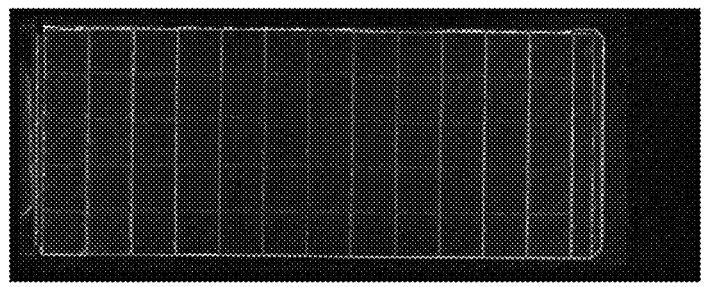
Figure 10B:
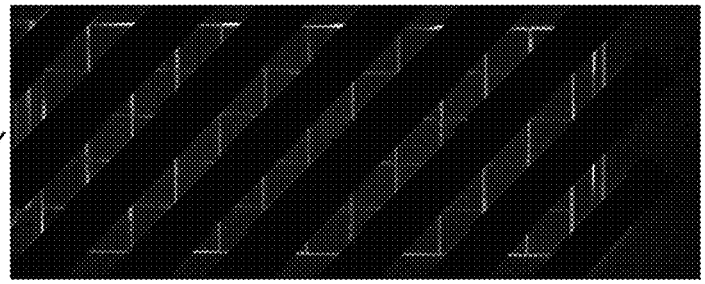
Figure 10A:
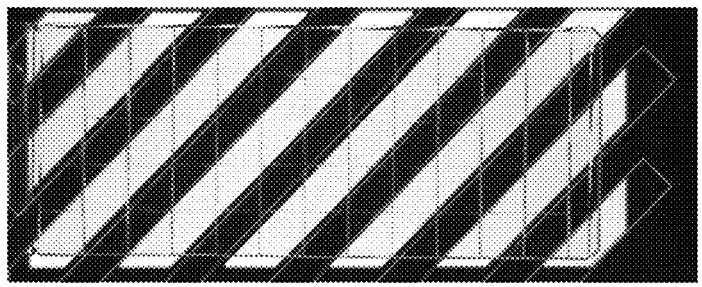
Figure 11B:
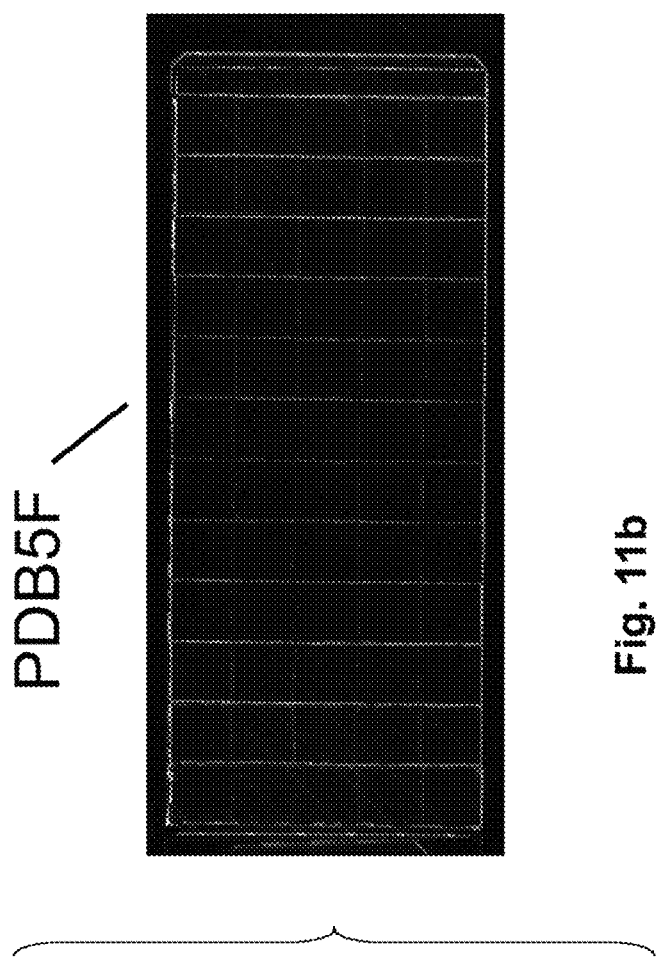
Figure 11A:
Figure 12:
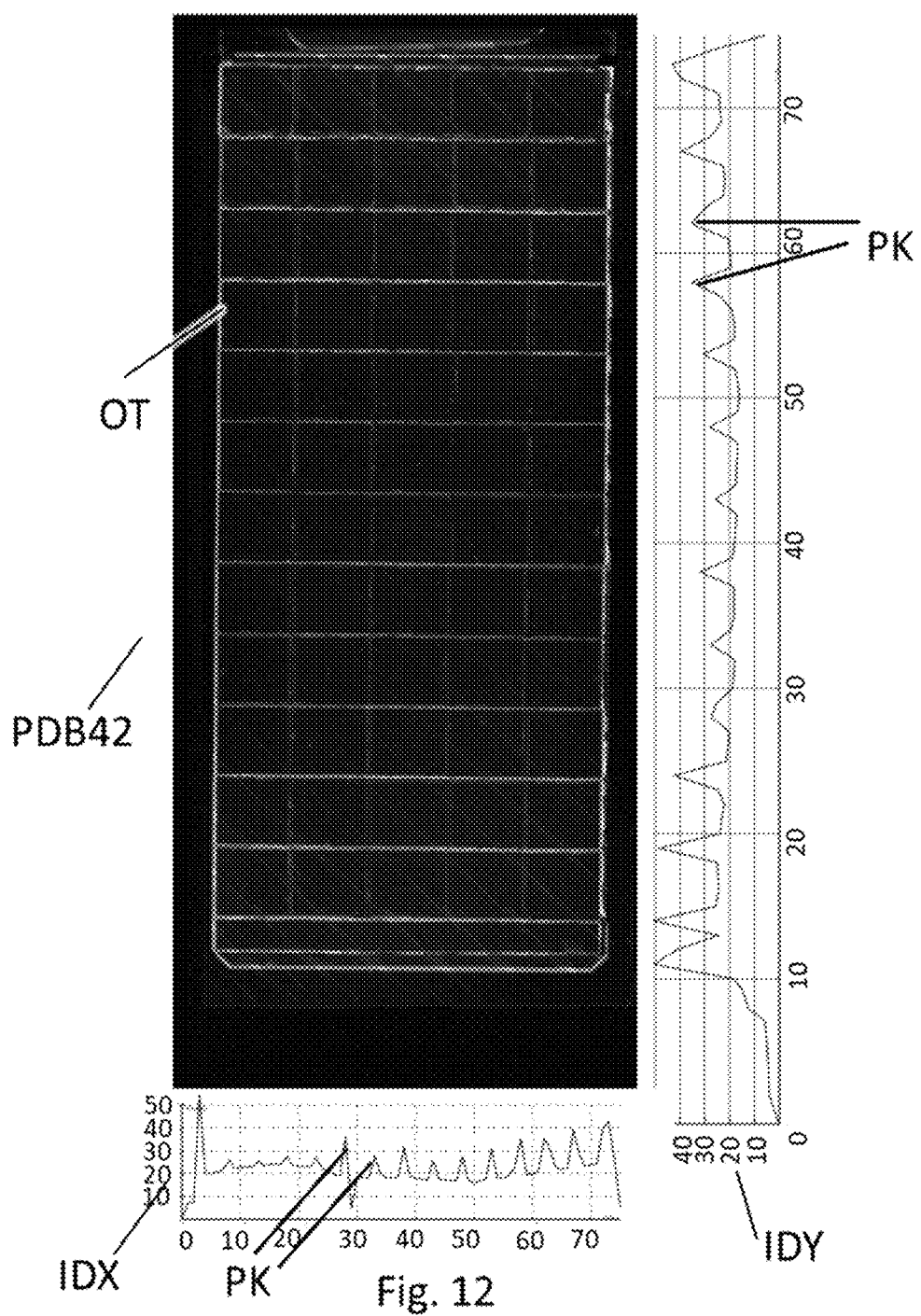
Figures 13A, 13B:
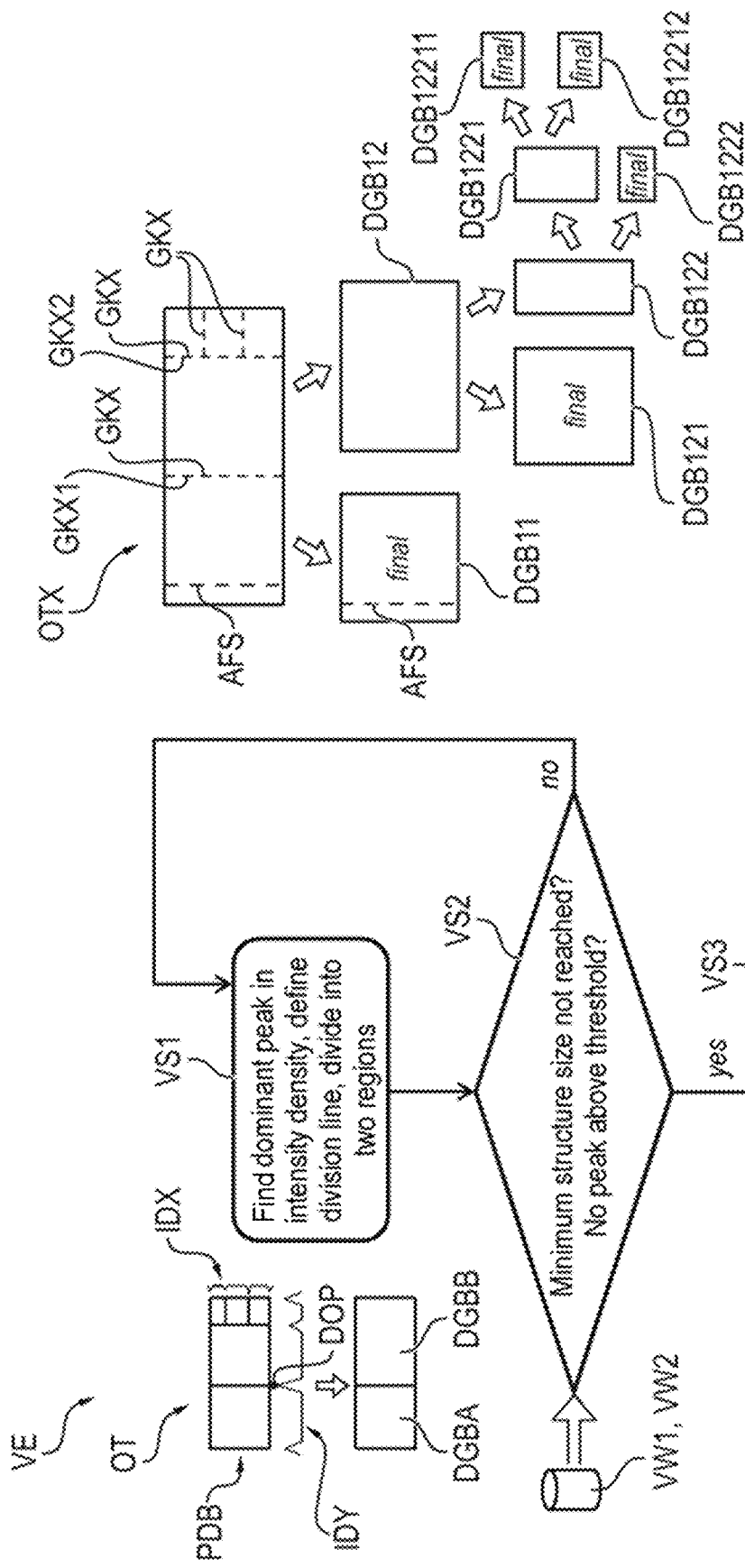
Figure 14B:
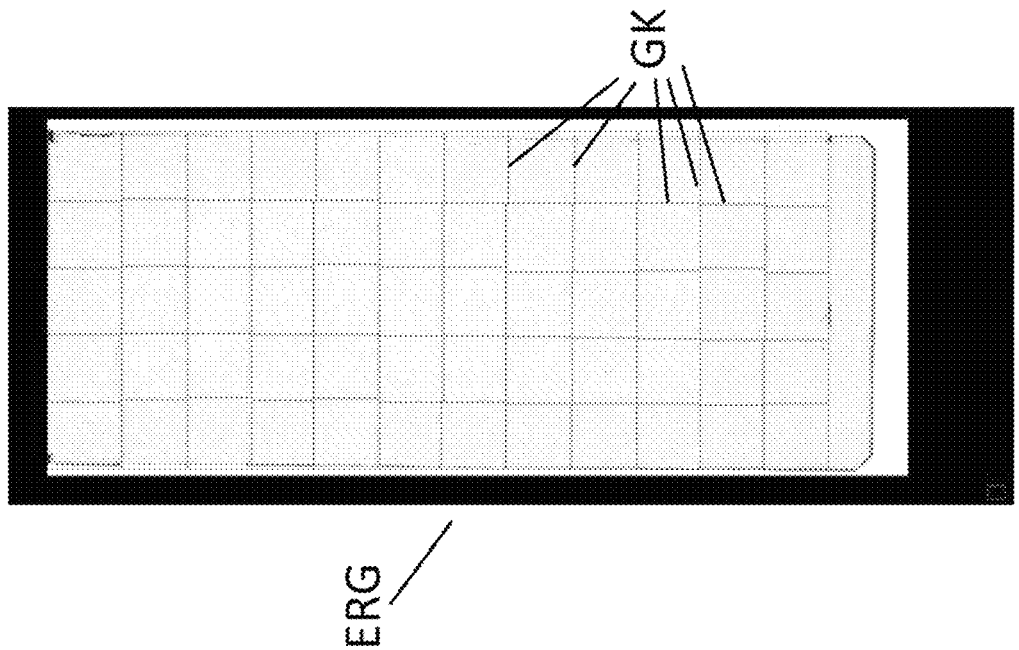
Figure 16:
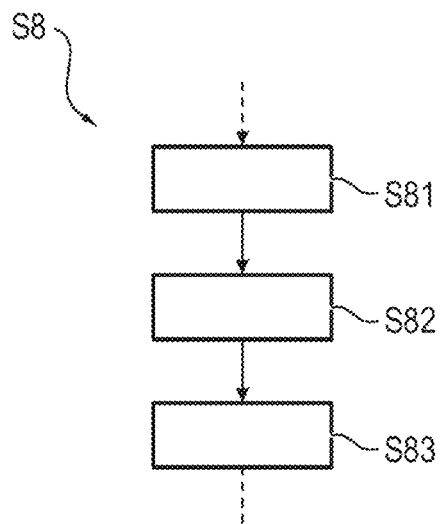
Figure 17:
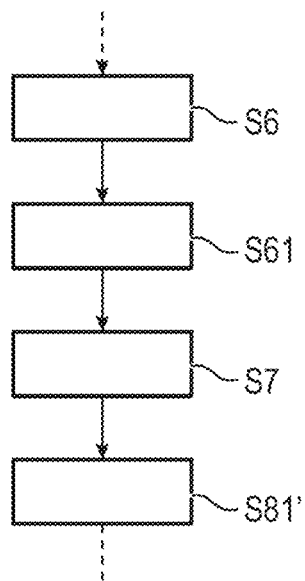
Figure 18:
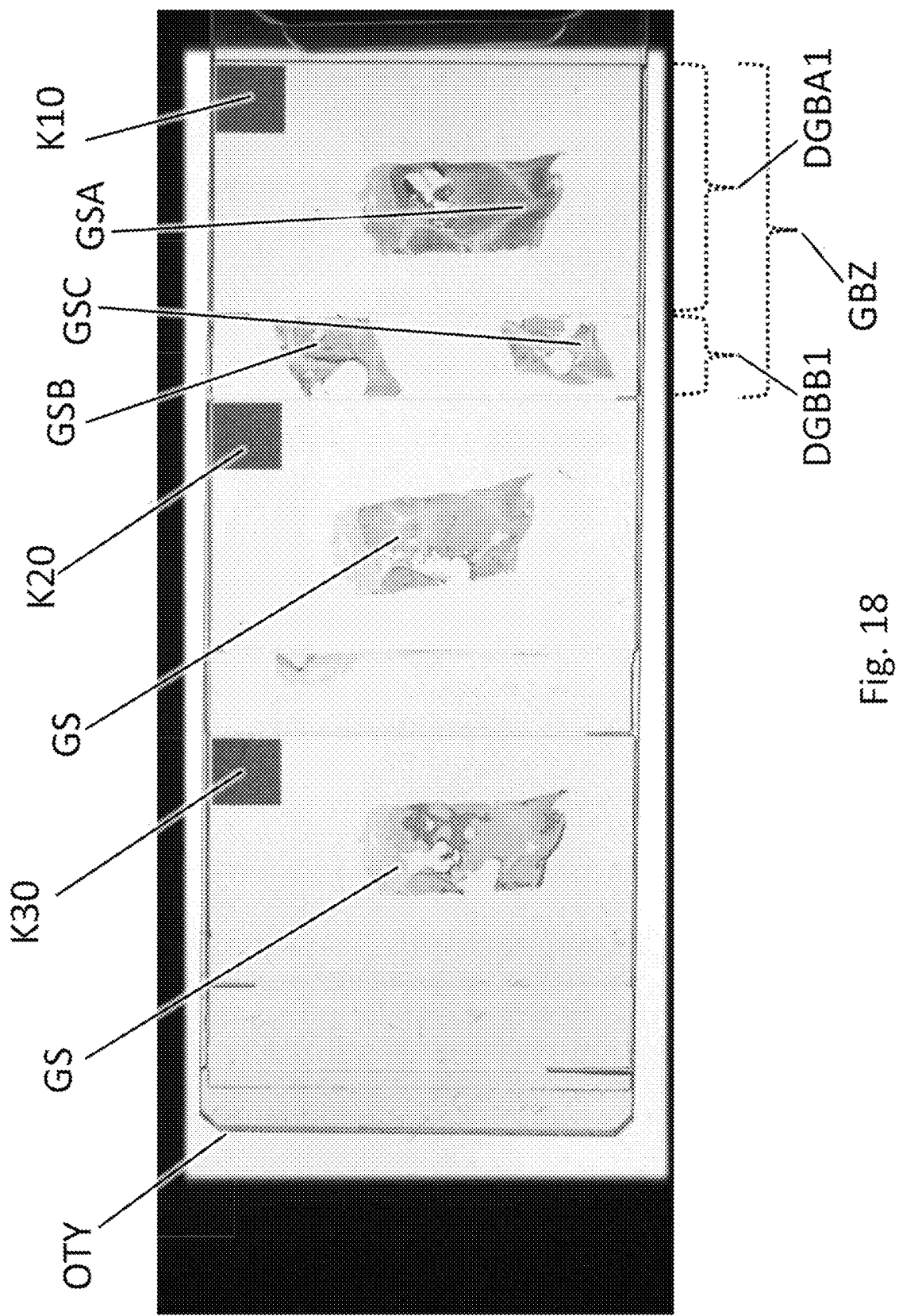

The invention is explained in more detail hereinafter on the basis of special embodiments without restriction of the general concept of the invention. In the figures:

FIG. 1 shows a schematic structure of a specimen slide having cover slips in tissue sections, FIG. 2 shows an incident light image of a specimen slide, FIG. 3a shows a transmitted light image of a specimen slide, FIG. 3b shows a further incident light image of a specimen slide having respective recognized spatial positions of respective optical identifiers, FIG. 4 shows a preferred embodiment of the apparatus according to the invention, FIG. 5 shows a further preferred embodiment of the apparatus according to the invention, FIG. 6 shows a first exemplary partial transmitted light image of a specimen slide, FIG. 7a shows a course of light beams in the acquisition of a partial transmitted light image of a specimen slide, FIG. 7b shows a schematic, exemplary illustration of a partial transmitted light image of a specimen slide, FIG. 8a shows an exemplary transmitted light image of a specimen slide, FIG. 8b shows a histogram of transformed parameters of the transmitted light image from FIG. 8a, FIG. 8c shows a binary mask of the transmitted light image from FIG. 8a, FIG. 8d shows the transmitted light image from FIG. 8a having detected respective spatial locations of the respective tissue sections, FIG. 9a shows a further exemplary partial transmitted light image, FIG. 9b shows derived image information from the partial transmitted light image from FIG. 9a, FIGS. 9c and 9d show further items of derived image information from the partial transmitted light image from FIG. 9a, FIG. 10a shows the exemplary partial transmitted light image from FIG. 9a, FIG. 10b shows items of image information extracted from the partial transmitted light image from FIG. 10a, FIG. 10c shows items of derived image information from multiple partial transmitted light images, FIG. 11a shows different partial transmitted light images of an identical specimen slide, FIG. 11b shows a composite item of image information from the multiple partial transmitted light images from FIG. 11a, FIG. 12 shows the composite image information from FIG. 11b and resulting intensity density values, FIG. 13a shows steps for identifying glass edges and for identifying cover slip regions, FIG. 13b shows exemplary illustrations of detected cover slip regions, FIG. 14a once again shows the derived items of image information from FIG. 10, FIG. 14b shows a detection result of cover slip regions for the image information from FIG. 14a, FIG. 15 shows steps of a preferred embodiment of the method according to the invention, FIG. 16 shows preferred steps for identifying cover slip regions, FIG. 17 shows preferred steps for identifying glass edges on the basis of multiple partially darkened transmitted light images, FIG. 18 shows an exemplary specimen slide in which respective tissue sections are to be assigned to respective cover slip regions of a single optical identifier.

FIG. 4 shows a preferred embodiment of the apparatus V according to the invention. The apparatus V has a planar light source L, which emits light LI. Furthermore, the apparatus V has an image acquisition unit BE, which is preferably a camera and which preferably has a camera objective KO as an integral component.

The apparatus V furthermore has a holding unit H for positioning a specimen slide OT between the planar light source L and the image acquisition unit BE.

The apparatus V furthermore has a slit diaphragm SB, preferably in the form of a rotatable screen RB, which is reversibly positionable between the planar light source L and the specimen slide OT.

FIG. 5 shows a further preferred embodiment of apparatus V1 from a perspective viewing angle. A rotatable screen RB has at least one slit diaphragm SB1 having multiple opening slits OS. The opening slits OS preferably extend in parallel to one another. By rotating the screen RB into a position in which the slit diaphragm SB1 is located between the light source L and the specimen slide OT, the operating state shown in FIG. 4 can be reached, so that light LI from the light source L is incident through the slit diaphragm SB on the specimen slide OT and the image acquisition unit BE can acquire a partially darkened transmitted light image of the specimen slide OT.

The apparatus V according to FIG. 4 furthermore has a control unit K. The control unit K can accept image data BID from the image acquisition unit BE. The apparatus V preferably has a storage unit SPE for storing data DT. The control unit K preferably uses the storage unit SPE for storing the image data BID. The control unit K preferably has an internal memory ISPE.

Via a control signal SIG, the control unit K actuates the rotatable screen RB or the slit diaphragm SB to position them differently in different operating states.

The illumination unit BL from FIG. 4 can direct light radiation LS on that surface OFL of the specimen slide OT which faces toward the image acquisition unit BE. If the illumination unit BL is switched on, the surface OFL of the specimen slide OT can thus be illuminated by the light radiation LS and then an incident light image of the specimen slide can be acquired via the image acquisition unit BE.

The control unit K actuates the illumination unit BL via a control signal SIG2. The control unit K actuates the light source L via a control signal SIG3.

The control unit K actuates, in a first operating state, the planar light source L in order to activate it and furthermore acquires a completely illuminated transmitted light image of the specimen slide OT via the image acquisition unit BE.

Such a completely illuminated transmitted light image is shown by way of example in FIG. 3*a*. In the meaning of this application, a complete transmitted light image is a transmitted light image in which all tissue sections provided on a specimen slide are completely illuminated by the light source L. In the meaning of this application, a complete transmitted light image is in particular a transmitted light image in which all tissue sections provided on a specimen slide are completely illuminated by the light source L and in which all cover slip regions which have tissue sections are completely illuminated through and are not darkened by a screen.

In the first operating state, for example, the rotatable screen RB of the apparatus V1 from FIG. 5 can be in a position such that a complete, large-area opening OF is located below the specimen slide OT, so that all cover slip regions which have tissue sections are completely illuminated through and are not darkened by a screen.

The apparatus V1 preferably has a rotatable screen RB, which has a first slit diaphragm SB1, a second slit diaphragm SB2, a third slit diaphragm SB3, and an opening OF.

In a second operating state, the control unit K then actuates the illumination unit BE in order to activate it and furthermore acquires an incident light image of the specimen slide OT via the image acquisition unit BE.

In a third operating state, the control unit K actuates the slit diaphragm SB1 or the rotatable screen RB so that the slit diaphragm SB1 is positioned between the planar light source L and the specimen slide OT. The rotatable screen RB from FIG. 5 can thus be rotated so that the slit diaphragm SB1 is positioned between the light source L and the specimen slide OT. In the third operating state, the control unit K furthermore acquires a partially darkened transmitted light image of the specimen slide OT via the image acquisition unit BE and with activated light source L. Such a partially darkened transmitted light image is shown by way of example as the image PDB21 in FIG. 6. In the meaning of this application, a partially darkened transmitted light image is a transmitted light image in which portions of the tissue sections and also portions of glass edges of the cover slip regions are shaded or darkened by a slit diaphragm or the slit diaphragm SB1 in relation to the light source L. Furthermore, in a partially darkened transmitted light image, other portions of the tissue sections and the glass edges of the cover slip regions are not shaded or darkened by a slit diaphragm or the slit diaphragm SB1 in relation to the light source L.

The monitoring unit K determines on the basis of the incident light image respective spatial positions of respective optical identifiers. Furthermore, the monitoring unit K determines on the basis of the partially darkened transmitted light image respective spatial locations of the respective cover slip regions. Furthermore, the monitoring unit K determines on the basis of the completely illuminated transmitted light image respective spatial locations of the respective tissue sections. Finally, the monitoring unit K assigns the respective tissue sections the respective optical identifiers. The previously determined cover slip regions are thus used to assign the respective tissue sections to the respective identifiers.

More detailed statements will now be made to explain one or more advantages of the apparatus according to the invention in more detail.

The incident light image AB from FIG. 2 is capable of reproducing the optical identifiers KE enough that they can be detected on the basis of the incident light image AB or so that respective spatial positions of the respective optical identifier KE can be determined. For this purpose, FIG. 3*b* shows an incident light image AB2 for the specimen slide OT with spatial positions P1, P2, P3, respectively determined by the control unit, each shown as dark rectangles in FIG. 3*b*, of the respective identifiers KE1, KE2, KE3. A completely or partially darkened transmitted light image is not suitable for sufficiently reproducing the optical identifiers KE.

Such positions P1, P2, P3 can be found or determined robustly and with high performance in the incident light image AB by routine image processing algorithms. Such a position P1, P2, P3 is then identified, for example, by a so-called bounding box. Algorithms for detecting corresponding optical identifiers KE1, KE2, KE3 are found, for example, in the libraries MVTecs Halcon or OpenCV. The control unit K preferably also determines, from the incident light image using the previously determined spatial position of the respective optical identifier, corresponding data from the identifiers KE to assign them to corresponding tissue sections.

As explained above, the object is to assign a respective tissue section GS1, GS2, GS3 to a respective identifier KE1, KE2, KE3. An identifier KE1, KE2, KE3 is always located on a corresponding cover slip region DB1, DB2, DB3, wherein every cover slip region does not necessarily have to have an identifier, as explained in more detail hereinafter with reference to FIG. 18. Therefore, every cover slip region DB1, DB2, DB3 does not necessarily have to have a separate identifier K1, KE2, KE3, instead a cover slip can have no identifier but the corresponding tissue section can be assigned to an identifier of another cover slip, as explained in more detail hereinafter with reference to FIG. 18.

In the course of the image processing, the cover slips or cover slip regions DB1, DB2, DB3 each have to be delimited from one another in order, on the basis of the respective spatial location of an optical identifier KE1 and a representation of a tissue section GS1, to be able to assign these to one another. As previously described, detecting glass edges GK on the basis of the incident light image AB from FIG. 2 is difficult and possibly subject to error.

FIG. 3*a* shows an exemplary completely illuminated transmitted light image DB of a specimen slide OT. While the tissue sections GS are well recognizable, the detection of the glass edges and thus also a determination of the respective spatial locations of the respective cover slip regions on the basis of the transmitted light image DB is difficult and possibly subject to error.

One essential aspect of the invention is that via the image acquisition unit BE, at least one partially darkened transmitted light image is acquired using the slit diaphragm SB1 having the multiple opening slits OS, and on the basis of the partially darkened transmitted light image, the respective spatial locations of the respective cover slip regions are determined. Furthermore, however, it is also provided according to the invention that a completely illuminated transmitted light image DB from FIG. 3*a* is to be available to acquire the tissue sections GS, since only then are the precise forms of the tissue sections GS visible. It is also provided according to the invention that an incident light image AB as from FIG. 2 is to be available to also be able to determine the spatial positions of the optical identifier and also be able to read out the identifiers KE. Because the apparatus V, V1 assigns the respective tissue sections to the respective optical identifiers on the basis of the three different images, this assignment is particularly robust and reliable.

The underlying physical effects which come to bear in the course of the acquisition of the partially darkened transmitted light image are explained in more detail in FIG. 7a.

FIG. 7a shows a side view of the light source L and the slit diaphragm SB1 and also the specimen slide OT. Light beams LS from the light source L pass through one or more opening slits OS to the specimen slide OT. If light beams are incident on a glass edge GK1, light LS is accordingly scattered at the glass edge DK1 and scattered as scattered light SL diverging toward the image acquisition unit BE or the objective KO. A light beam LS2, which is not incident on a glass edge, is transmitted through the specimen slide OT. The scattered light SL is then imaged by the camera objective KO on an imaging point AP of a sensor SE of the image acquisition unit BE.

FIG. 7b shows for this purpose in a top view by way of example an illustration of an exemplary schematic drawing of a partially darkened transmitted light image PB11 of a specimen slide in the case in which the opening slits of the slit diaphragm extend in parallel to the glass edge GK1.

The region AB, which is darkened per se in the partial transmitted light image PB11 has a glass edge GK1 which appears bright due to the scattered light effect from FIG. 7a. The glass edge GK1 is therefore visible in the image PB11, since the scattered light SL, which is imaged on the imaging point AP of the sensor SE, stands out in its overall intensity in the image PB11 from the signal intensity of the remaining background region of the imaging region AB. In other words: the signal strength of the scattered light SL is high enough in relation to the signal strength of the further regions of the darkened region AB.

For a glass edge GK2, which is located in a non-darkened region NB, there is also a scattered light effect. However, the resulting signal strength for a corresponding glass edge GK2 is not significantly higher than the signal strength of the non-darkened region NB in other regions. A corresponding glass edge is therefore not well visible in the non-darkened region NB.

A corresponding effect is recognizable in FIG. 6, since in the partially darkened transmitted light image PDB21, a glass edge is only visible in darkened regions in each case in partial edge regions TK.

The image PDP21 was acquired in a configuration in which the opening slits of the slit diaphragm have an angle of approximately 45° in relation to the glass edges of the specimen slide. This configuration is advantageous for glass edges extending solely horizontally, extending solely vertically, or combinations thereof, since then the probability that a darkened region will meet a glass edge is higher than in a configuration in which the opening slits extend in parallel to the glass edges. This was previously the case in the illustration of FIGS. 7a and 7b. Because the slit diaphragm SB1, see FIG. 5, has multiple opening slits extending in parallel to one another, the probability of generating at least one representation of a partial glass edge TK, see FIG. 6, in a partially darkened transmitted light image is higher for multiple glass edges than if only one opening slit is provided.

The way in which respective spatial locations of the respective cover slip regions can be determined on the basis of a partially darkened transmitted light image PB21 is explained in more detail hereinafter.

Firstly, however, a detailed explanation is given of how respective spatial locations of the respective tissue sections can be determined on the basis of a completely illuminated transmitted light image.

FIG. 8a shows a transmitted light image DB2 for this purpose. Such an image DB2 can be acquired in an RGB color space (red, green, blue). The RGB values can then be transformed via a transformation in an HSV parameter space having the values hue, saturation, and intensity (H, S, R). For this purpose, FIG. 8b shows a histogram HIS of the transmitted light image DB2 for the parameters saturation and intensity. The aggregation region AG of particularly high values represents the bright or white background here. A threshold value with respect to intensity values can then be ascertained on the basis of the histogram HIS and the aggregation region AG. A binary value of 0 or 1 can then be assigned to each image pixel in dependence on its individual intensity value on the basis of such a threshold value, so that a binary mask BIN results as shown in FIG. 8c. Such binary information or a binary mask BIN can then be used by typical image processing algorithms to determine respective spatial locations RG1, RG2 RG3 of the respective tissue sections GS1, GS2, GS3, preferably in this case as a bounding box, for the transmitted light image DB2, as shown in FIG. 8d.

More precise explanations for determining respective spatial locations of the respective cover slip regions or respective cover slips on the basis of one or more partially darkened transmitted light images follow hereinafter.

FIG. 9a shows a partially darkened transmitted light image PDB3 for this purpose. An item of image information PDB32 may be extracted from the image PDB3, which represents the image information from the partially darkened regions. Furthermore, an item of image information PDB31 may preferably also be extracted from the image PDB3, see FIG. 9b. The image information PDB31 represents the image information of the non-partially darkened regions, wherein the brightness values were inverted in the information PDB31.

The image information PDB33 from FIG. 9c represents a superposition of the items of image information PDB31 and PDB32 from FIG. 9b. FIG. 9d shows an item of image information PDB34, in which a presence of glass edges in the horizontal direction was amplified via a Fast Fourier transform to suppress signals in a specific direction, preferably 45°. Such an item of image information PDB34 can then furthermore be used to detect respective spatial locations of respective cover slip regions, as is explained hereinafter in more detail with reference to FIGS. 12, 13a, 13b.

FIG. 10a shows a partially darkened transmitted light image PDB4, for which a corresponding item of image information PDB41 in FIG. 10b represents an item of image information from the darkened regions. If further partially darkened transmitted light images are now acquired via multiple slit diaphragms SB1, SP2, SP3 from FIG. 5, and if essentially complete coverage of the entire area of the specimen slide results via the entirety of partially darkened transmitted light images, an overall item of image information PB42, as shown in FIG. 10c, can then be obtained. The image information PB42 represents a superposition of the items of image information of the respective darkened regions of the respective partially darkened transmitted light images, which were obtained via different slit diaphragms.

For this purpose, FIG. 11a shows a further example of respective partially darkened transmitted light images PDB51, PDB52, PDB53, the respective items of image information of which can be superimposed for the respective darkened regions, to obtain a final item of image information PDBSF from FIG. 11b. Such an item of image information PDBSF or an item of image information PDB42 can then furthermore be used alternatively to the image information PDB34 to determine the respective spatial locations of the respective cover slip regions.

The use of multiple partially darkened transmitted light images for determining the respective spatial locations of the respective cover slip regions is particularly advantageous since the resulting image information PDB42, PDBSF in this case shows a stronger signature of the signals of glass edges than upon a use of only one partially darkened transmitted light image PDB3 to obtain a corresponding item of image information PDB34. The multiple slit diaphragms SB1, SB2, SB3 (see FIG. 5) preferably each have multiple opening slits extending in parallel to one another, wherein furthermore the opening slits of the slit diaphragms SB1, SB2, SB3 are not congruent with one another but offset in relation to one another. Because the multiple slit diaphragms SB1, SB2, SB3 (see FIG. 5) each have multiple opening slits extending in parallel to one another, and furthermore the opening slits of the slit diaphragms SB1, SB2, SB3 are not congruent but rather offset in relation to one another, the probability of generating a sufficient number of representations of partial glass edges TK, see FIG. 6, for the multiple glass edges, as a whole in the partially darkened transmitted light images PDB51, PDB52, PDB53, so that in a final item of image information PDBSF (see FIG. 11*b*) based on the multiple partially darkened transmitted light images PDB51, PDB52, PDB53, a presence of the glass edges and thus an identification of the cover slip regions can take place sufficiently robustly and reliably.

The apparatus from FIG. 5 preferably has, as described above, a rotatable screen RB, which has a first slit diaphragm SB1, a second slit diaphragm SB2, a third slit diaphragm SB3, and an opening OF. This is advantageous in particular if the completely illuminated transmitted light image, the incident light image, and the multiple, preferably three partially illuminated transmitted light images are acquired via the same image acquisition unit BE. This is because the specimen slide OT then only has to be inserted a single time into the holder H (see FIG. 4). A respective operating state can then be brought about in each case via rotation of the rotatable screen in a particularly simple and robust manner, in which the completely illuminated transmitted light image, the incident light image, and the multiple, preferably three partially illuminated transmitted light images are acquired. For this purpose, it is also not necessary for the specimen slide OT to be moved. The incident light image can be acquired in a configuration or an operating state in which any one of the diaphragms SB1, SB2, SB3 or the opening OF is positioned between the light source L and the specimen slide.

In the first operating state, the rotatable screen RB is preferably configured so that the opening OF is located between the planar light source L and the specimen slide OT. The completely illuminated transmitted light image is then acquired by the image acquisition unit in the first operating state.

In the third operating state, the rotatable screen RB is preferably configured so that the first slit diaphragm SB1 is located between the planar light source L and the specimen slide OT. The first partial transmitted light image is then acquired by the image acquisition unit in the third operating state.

In the fourth operating state, the rotatable screen RB is preferably configured so that the second slit diaphragm SB2 is located between the planar light source L and the specimen slide OT. The second partial transmitted light image is then acquired by the image acquisition unit in the fourth operating state.

In the fifth operating state, the rotatable screen RB is preferably configured so that the third slit diaphragm SB3 is located between the planar light source L and the specimen slide OT. The third partial transmitted light image is then acquired by the image acquisition unit in the fifth operating state.

FIG. 12 shows values IDX, IDY of intensity densities ID ascertained for the image information PDB42 from FIG. 10*c*. Along straight lines in the X direction, intensities are summed and then scaled via length of the straight lines, so that intensity densities ID result as values IDX as shown. This takes place in the same way for straight lines in the Y direction for ascertaining intensity density values IDY. At those points at which glass edges are present, respective local maximum values or peaks PK result. The way in which such intensity density values IDX, IDY and the peak values PK can be used to determine cover slip regions in their location or position will now be explained hereinafter.

FIG. 13*a* shows method steps VE for this purpose. For the image information PDB of the partially darkened transmitted light image, exemplary intensity density values IDX, IDY are also plotted. The highest intensity density value or the dominant peak DOP is determined from these values IDX, IDY. This peak DOP is used to divide the specimen slide OT virtually into two cover slip regions DGBA, DGBB at the point of its location. The consideration is thus that a dominant peak indicates a glass edge GKX as shown in FIG. 13*b*, or the location of a glass edge GKX, and then the specimen slide OT can be divided into these virtual cover slip regions DGBA, DGBB. This takes place in a first method step VS1. The glass edge GKX can initially be viewed as a potential glass edge. In order that the glass edge GKX is also identified as an actual glass edge, for example, the intensity density value of the dominant peak DOP or the maximum preferably has to exceed a predetermined threshold value VW2. Intensity values which do not exceed this threshold value VW2 can be classified as a noise signal or artifact signal, so that a glass edge viewed as potential is not identified as actual. The threshold value VW2 can be considered to be an item of specification information. This check takes place in method step VS2. Furthermore, a further condition preferably has to be met in method step VS2. This further condition is that the resulting size or extension of the newly created virtual cover slip regions DGBA, DGBB exceeds a minimum size or a minimum value VW1. This type of specification information VW1 is helpful, since in this way it is possible to avoid dividing the specimen slide OT into excessively small virtual cover slip regions due to peaks having specific intensity density values.

If both conditions are met, in a further method step VS3, an output or feedback of the determined cover slip regions DGBA, DGBB is carried out.

The method VE is then carried out again recursively for previously determined cover slip regions DGBA, DGBB to possibly also be able to subdivide these previously determined virtual cover slip regions DGBA, DGBB still further.

FIG. 13*b* shows an exemplary illustration of a specimen slide OTX having glass edges GKX and an artifact signal AFS. It will now be explained how, via the method from FIG. 13*a* of the object carrier, the actual cover slip regions DGB11, DGB121, DGB11222, DGB12211, and DGB12212 can be identified via a detection of potential glass edges and an identification of actual glass edges.

First, the edge GKX1 is detected as a potential glass edge. With the aid of specification information VW1, VW2, in step S2, the potential glass edge GKX1 is identified as an actual glass edge and the virtual cover slip regions DGB11 and DGB12 are determined.

The virtual cover slip region DGB11 is then considered. The artifact signal AFS in the cover slip region DGB11 does not exceed, for example, the predetermined threshold value in its intensity density, so that the cover slip region DGB11 is not subdivided further and is identified as a cover slip region.

The ascertained virtual cover slip region DGB12 is then subdivided by detection of a further glass edge GKX2 via a further dominant peak into the cover slip regions DGB121 and DGB122. A further subdivision of the cover slip region DGB121 does not take place because no further glass edges or peaks can be detected, which meet the conditions placed with respect to the items of specification information.

The cover slip region DGB122 is subdivided due to an actual glass edge into the cover slip regions DGB1221 and DGB1222. Finally, the cover slip region DGB1221 is subdivided due to an actual glass edge into the cover slip regions DGB12211 and DGB12212.

Corresponding cover slip regions of the specimen slide OTX can thus be determined with respect to their respective spatial location.

In summary, it can be stated that on the basis of the partially darkened transmitted light image, potential glass edges GKX, AFS can be detected on the specimen slide OTX, furthermore actual glass edges GKX can be identified on the basis of the potential glass edges GKX, AFS and on the basis of at least one item of specification information VW1, VW2, and finally on the basis of the actual glass edges GKX, the cover slip regions DGB11, DGB121, DGB11222, DGB12211, and DGB12212 can be identified.

Knowing these spatial locations of the respective cover slip regions, tissue sections which are located in corresponding cover slip regions can then be assigned to the respective identifiers of the respective cover slip regions in which they are located.

Figure 14A:
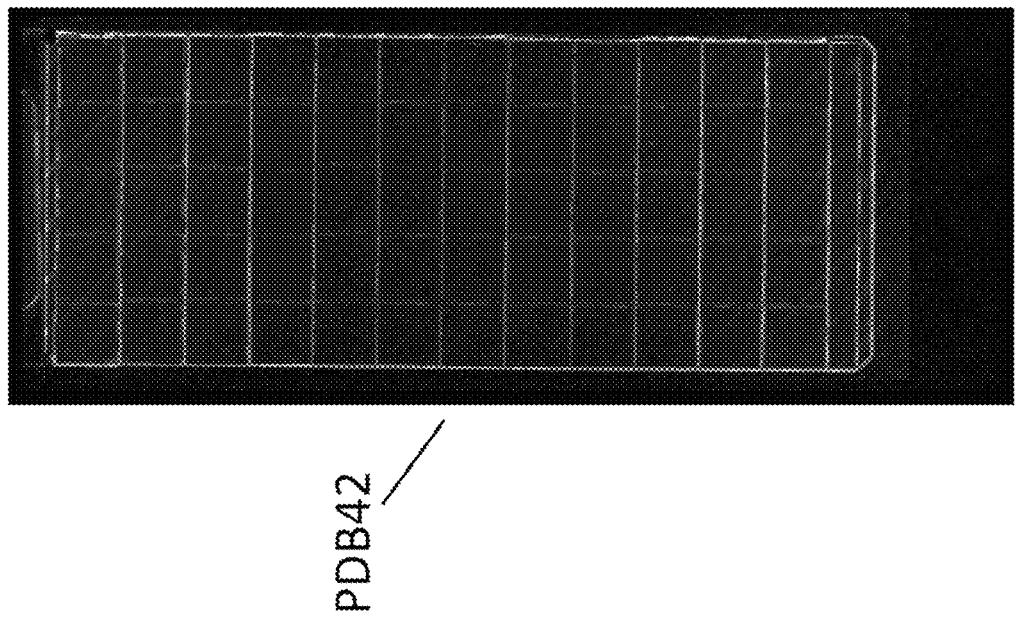

FIG. 14a shows for the image information PD42 adjacent thereto in FIG. 14b the detection result ERG of cover slip regions and the detected glass edges shown for this purpose. It is apparent that the method presented here is particularly high performance, since a majority of small cover slip regions is also reliably detected.

FIG. 18 shows a further exemplary specimen slide OTY having different tissue sections GS, GSA, GSB, GSC and identifiers K10, K20, K30, wherein in particular the tissue sections GSA, GSB, and GSC within an overall region GBZ are to be assigned to an identifier K10. It can be provided that multiple tissue sections GSA, GSB, GSC are present jointly on a specimen slide OTY and also can be jointly assigned to an identifier K10 but are not positioned there by a single common cover slip but rather different cover slips DGBA1, DGBB1. It is therefore preferably proposed that by using the above-described method, glass edges present on the specimen slide are detected on the basis of one or more partially darkened transmitted light images. On the basis of the detected glass edges, cover slip regions DGBB1, DGBA1 are then identified as described above. A further item of specification information can then be provided to combine the identified cover slip regions DGBA1, DGBB1 into a common region GBZ and assign them to the identifier K10. The specification information can be, for example, that a majority of cover slip regions DGBA1, DGBB1 can be arranged in a preferred extension direction, in this case in the Y direction or in the horizontal direction, wherein in the case in which no identifier was identified for cover slip region DGBB1, this cover slip region DGBB1 is assigned to an identical common identifier K10 of a further cover slip region DGBA1 arranged in a preferred extension direction. If no identifier is recognized or identified for cover slip region DGBB1, this cover slip region DGBB1 is thus to be assigned to the identifier K10 of the cover slip region DGBA1 adjacent in a specific direction, preferably to the right in the horizontal direction.

The invention and its embodiments were explained up to this point on the basis of the apparatus according to the invention. As described above, a method according to the invention is also proposed. The individual steps of the method according to one preferred embodiment are illustrated in FIG. 15.

In a step S1, positioning of the specimen slide between a planar light source and an image acquisition unit takes place.

In a step S2, provision of a reversibly positionable slit diaphragm, which has multiple opening slits, between the planar light source and the object takes place.

In a step S3, provision of an illumination unit designed to illuminate that surface of the specimen slide which faces toward the image acquisition unit takes place.

In a step S4, in a first operating state, the planar light source is then activated and a completely illuminated transmitted light image of the specimen slide is acquired via the image acquisition unit.

In a step S5, in a second operating state, the illumination unit is then activated and an incident light image of the specimen slide is acquired via the image acquisition unit.

In a third operating state, in a step S6, the slit diaphragm is then actuated in such a way that the slit diaphragm is positioned between the planar light source and the specimen slide, and furthermore the planar light source is activated and a partially darkened transmitted light image of the specimen slide is acquired via the image acquisition unit.

In a preferred step S7, a determination of respective spatial positions of respective optical identifiers on the basis of the incident light image then preferably takes place.

In a preferred step S8, a determination of respective spatial locations of the respective cover slip regions on the basis of the partially darkened transmitted light image then preferably takes place.

In a preferred step S9, a preferred determination of respective spatial locations of the respective tissue sections on the basis of the completely illuminated transmitted light image then takes place.

In a step S10, an assignment of respective tissue sections to respective optical identifiers then takes place.

Steps S4 to S10 are preferably carried out by the control unit K from FIG. 4.

FIG. 16 shows further preferred steps.

Step S8 from FIG. 15 preferably takes place by carrying out further partial steps S81, S82, S83.

In a step S81, a detection of potential glass edges present on the specimen slide on the basis of the partially darkened transmitted light image takes place. In a step S82, an identification of actual glass edges on the basis of the potential glass edges and at least one item of specification information VW1, VW2 takes place.

In a step S83, an identification of cover slip regions on the basis of the actual glass edges then takes place.

FIG. 17 shows further steps preferably to be executed in the case of a use of multiple partially darkened transmitted light images. Subsequently to step S6, already explained above in FIG. 15, in a step S61, in a fourth operating state, an actuation of the second slit diaphragm takes place in such a way that the second slit diaphragm is positioned between the planar light source and the specimen slide. Furthermore, an activation of the light source and an acquisition of a second partially darkened transmitted light image via the image acquisition unit take place. Above-described step S7 from FIG. 15 then follows, in which respective spatial positions of respective optical identifiers are determined. A step S81' then follows, in which the respective spatial locations of the respective cover slip regions are determined on the basis of the first partially darkened transmitted light image and the second partially darkened transmitted light image.

Furthermore, a digital image processing method is proposed. For this purpose, a provision of a completely illuminated transmitted light image of the specimen slide, an incident light image of the specimen slide, and a partially darkened transmitted light image of the specimen slide takes place. This provision can take place in that the image acquisition unit BE from FIG. 4 provides these images to the control unit K. Furthermore, the provision can preferably take place in that the control unit K loads such image data BID, DT from the storage unit SPE into an internal memory of the control unit K. The internal memory is the memory ISPE.

The digital image processing method can be a computer-limited method. Furthermore, a computer program product can be provided which comprises commands which, upon execution of the program by a computer, cause it to carry out the method as a computer-implemented method.

Although some aspects were described in conjunction with an apparatus, it is apparent that these aspects also represent a description of the corresponding method, so that a block or a component of an apparatus is also to be understood as a corresponding method step or as a feature of a method step. Similarly thereto, aspects which were described in conjunction with a or as a method step also represent a description of a corresponding block or detail or feature of the corresponding apparatus.

The control unit K from FIG. 4 can also be implemented as a computing unit, which is designed accordingly as described above.

Depending on the specific implementation requirements, exemplary embodiments of the invention can be implemented in hardware or in software. The implementation can be carried out using a digital storage medium, for example, a floppy disk, a DVD, a Blu-ray disk, a CD, a ROM, a PROM, an EPROM, an EEPROM, or a FLASH memory, a hard drive, or another magnetic or optical memory, on which electronically readable control signals are stored which can interact or interact with a programmable hardware component in such a way that the respective method is carried out. The digital storage medium can therefore be machine-readable or computer-readable. Some exemplary embodiments thus comprise a data carrier which has electronically readable control signals which are capable of interacting with a programmable computer system or a programmable hardware component in such a way that one of the methods described herein is carried out. One exemplary embodiment is thus a data carrier (or a digital storage medium or a computer-readable medium), on which the program for carrying out one of the methods described herein is recorded.

A programmable hardware component as a computing unit can be formed by a processor, a computer processor (CPU=Central Processing Unit), a graphics processor (GPU=Graphics Processing Unit), a computer, a computer system, an application-specific integrated circuit (ASIC), an integrated circuit (IC), a one-chip system (SOC=System on Chip), a programmable logic element, or a field-programmable gate array having a microprocessor (FPGA).

In general, exemplary embodiments of the present invention can be implemented as a program, firmware, computer program, or computer program product having a program code or as data, wherein the program code or the data is or are active so as to carry out one of the methods when the program runs on a processor or a programmable hardware component. The program code or the data can also be stored, for example, on a machine-readable carrier or data carrier. The program code or the data can be provided, inter alia, as source code, machine code, or byte code and as other intermediate code.

The invention claimed is:

1. An apparatus for identifying respective cover slip regions (DGB) of respective cover slips having respective tissue sections (GS, GS1, GS2, GS3) on a specimen slide (OT), which has multiple optical identifiers (KE1, KE2, KE3), including
a planar light source (L),
an image acquisition unit (BE),
a holding unit (H) for positioning the specimen slide (OT) between the planar light source (L) and the image acquisition unit (BE),
a rotatable screen (RB) comprising at least one of a slit diaphragm (SB, SB1) and an opening (OF), wherein the slit diaphragm (SB, SB1) is comprised of multiple opening slits (OS),
the rotatable screen reversibly positionable between the planar light source (L) and the specimen slide (OT), such that the slit diaphragms (SB, SB1) and opening (OF) are reversibly positionable between the planar light source (L) and the specimen slide (OT),
an illumination unit (BL) designed to illuminate that surface (OFL) of the specimen slide (OT) which faces toward the image acquisition unit (BE),
and furthermore a control unit (K), which is designed,
in a first operating state, to activate the planar light source (L) and to acquire a completely illuminated transmitted light image (DB, DB2) of the specimen slide (OT) while upon the opening (OF) of the rotatable screen (RB) via the image acquisition unit (BE),
furthermore, in a second operating state, to activate the illumination unit (BL) and to acquire an incident light image (AB, AB2) of the specimen slide (OT) via the image acquisition unit (BE),
wherein the control unit is characterized in that,
furthermore, in a third operating state, to actuate the rotatable screen (RB) in such a way that the slit diaphragm (SB, SB1) is positioned between the planar light source (L) and the specimen slide (OT), and to activate the planar light source (L) and to acquire a partially darkened transmitted light image (PDB3) of the specimen slide (OT) via the image acquisition unit (BET),
to furthermore determine, on the basis of the incident light image (AB, AB2), respective spatial positions (P1, P2, P3) of respective optical identifiers (KE1, KE2, KE3),
furthermore, on the basis of the partially darkened transmitted light image (PDB3), to determine respective spatial locations of the respective cover slip regions (DGB),
furthermore, on the basis of the completely illuminated transmitted light image (DB, DB2), to determine respective spatial locations of the respective tissue sections (GS, GS1, GS2, GS3)

and, on the basis of the respective spatial positions (P1, P2, P3) of the respective optical identifiers (KE1, KE2, KE3), on the basis of the respective spatial locations of the respective cover slip regions (DGB), and on the basis of the respective spatial locations of the respective tissue sections (GS1, GS2, GS3), to assign the respective tissue sections to the respective optical identifiers (KE1, KE2, KE3).

2. The apparatus as claimed in claim 1, wherein the control unit (K) is furthermore designed,
on the basis of the partially darkened transmitted light image (PDB3) to detect potential glass edges (GK) of cover slips on the specimen slide (OT),
and furthermore on the basis of the potential glass edges (GK) and on the basis of at least one item of specification information (VW1, VW2), to identify actual glass edges (GK) of cover slips,
and furthermore to identify the cover slip regions (DGB) on the basis of the actual glass edges (GK).

3. The apparatus as claimed in claim 1, wherein the slit diaphragm (SB1) is a first slit diaphragm and wherein the partially darkened image is a first partially darkened image (PDB51), wherein the apparatus (V) furthermore has a second slit diaphragm (SB2) reversibly positionable between the planar light source (L) and the specimen slide (OT), which has multiple opening slits (OS),
wherein the control unit (K) is furthermore designed,
in a fourth operating state, to actuate the second slit diaphragm (SB2) in such a way that the second slit diaphragm (SB2) is positioned between the planar light source (L) and the specimen slide (OT), and to activate the planar light source (L) and to acquire a second partially darkened transmitted light image (PDB52) of the specimen slide (OT) via the image acquisition unit (BE),
and furthermore, on the basis of the partially darkened transmitted light images (PDB51, PDB52) to determine the respective spatial locations of the respective cover slip regions (DGB).

4. A method for identifying respective cover slip regions (DGB) of respective cover slips having respective tissue sections (GS, GS1, GS2, GS3) on a specimen slide (OT), which has multiple optical identifiers (KE1, KE2, KE3), including
positioning, via a control unit (K), the specimen slide (OT) placed upon a rotatable screen (RB) between a planar light source (L) and an image acquisition unit (BE),
providing a reversibly positionable slit diaphragm (SB, SB1), which has multiple opening slits (OS), between the planar light source (L) and the specimen slide (OT), wherein the slit diaphragm (SB, SB1) is disposed upon the rotatable screen (RB),
providing an illumination unit (BE), designed to illuminate, via the control unit (K) that surface of the specimen slide (OT) placed upon an opening (OF) of the rotatable screen (RB), which faces toward the image acquisition unit (BE),
in a first operating state, activating, via the control unit (K), the planar light source (L) and acquiring a completely illuminated transmitted light image (PDB3) of the specimen slide (OT) via the image acquisition unit (BE),
in a second operating state, activating the illumination unit (BE), via the control unit (K), and acquiring an incident light image (AB) of the specimen slide (OT) via the image acquisition unit (BE),
characterized by,
in a third operating state, actuating the rotatable screen (RB), via the control unit (K), in such a way that the slit diaphragm (SB, SB1) is positioned between the planar light source (L) and the specimen slide (OT), and furthermore activating, via the control unit (K), the planar light source (L) and acquiring a partially darkened transmitted light image (PDB3) of the specimen slide (OT) via the image acquisition unit (BE),
determining respective spatial positions (P1, P2, P3) of respective optical identifiers (KE1, KE2, KE3) on the basis of the incident light image (AB),
determining respective spatial locations of the respective cover slip regions (DGB) on the basis of the partially darkened transmitted light image (PDB3),
and furthermore determining respective spatial locations of the respective tissue sections (GS, GS1, GS2, GS3) on the basis of the completely illuminated transmitted light image (DB)
and assigning the respective tissue sections (GS, GS1, GS2, GS3) to the respective optical identifiers (KE1, KE2, KE3) on the basis of the respective spatial positions (P1, P2, P3) of the respective optical identifiers (KE1, KE2, KE3), on the basis of the respective spatial locations of the respective cover slip regions (DGB), and on the basis of the respective spatial locations of the respective tissue sections (GS, GS1, GS2, GS3).

5. The method as claimed in claim 4, furthermore including
detecting potential glass edges (GK) of cover slips on the specimen slide (OT) on the basis of the partially darkened transmitted light image (PDB3),
identifying actual glass edges (GK) on the basis of the potential glass edges (GK) and on the basis of at least one item of specification information (VW1, VW2),
and furthermore identifying the cover slip regions (DGB) on the basis of the actual glass edges (GK).

6. The method as claimed in claim 4, wherein the slit diaphragm is a first slit diaphragm (SB1) and wherein the partially darkened image is a first partially darkened image (PDB51), furthermore including
providing a second slit diaphragm (SB2) reversibly positionable between the planar light source (L) and the specimen slide (OT), which has multiple opening slits (OS),
and furthermore including,
in a fourth operating state, actuating the second slit diaphragm (SB2) in such a way that the second slit diaphragm (SB2) is positioned between the planar light source (L) and the specimen slide (OT), and furthermore activating the planar light source (L) and acquiring a second partially darkened transmitted light image (PDB52) of the specimen slide (OT) via the image acquisition unit (BE),
and furthermore determining the respective spatial locations of the respective cover slip regions (DGB) on the basis of the partially darkened transmitted light images (PDB51, PDB52).

7. A digital image processing method for identifying respective cover slip regions (DGB) of respective cover slips having respective tissue sections (GS, GS1, GS2, GS3) on a specimen slide (OT), which has multiple optical identifiers (KE1, KE2, KE3), including
providing a completely illuminated transmitted light image (DB) of the specimen slide (OT), providing an incident light image (AB) of the specimen slide (OT), which is configured to reproduce the optical identifiers enough that they can be detected on the basis of the incident light image (AB) or so that respective spatial positions of the respective optical identifiers can be determined, providing a partially darkened transmitted light image (PDB3) of the specimen slide (OT), determining respective spatial positions (P1, P2, P3) of respective optical identifiers (KE1, KE2, KE3) on the basis of the incident light image (AB), determining respective spatial locations of the respective cover slip regions (DGB) on the basis of the partially darkened transmitted light image (PDB3), characterized by determining respective spatial locations of the respective tissue sections (GS, GS1, GS2, GS3) on the basis of the completely illuminated transmitted light image (PB), and assigning the respective tissue sections (GS, GS1, GS2, GS3) to the respective optical identifiers (KE1, KE2, KE3) on the basis of the respective spatial positions (P1, P2, P3) of the respective optical identifiers (KE1, KE2, KE3), on the basis of the respective spatial locations of the respective cover slip regions (DGB), and on the basis of the respective spatial locations of the respective tissue sections (GS, GS1, GS2, GS3).

8. A computer-implemented method for identifying respective cover slip regions (DGB) of respective cover slips having respective tissue sections (GS, GS1, GS2, GS3) on a specimen slide (OT), which has multiple optical identifiers (KE1, KE2, KE3), including the following steps providing a completely illuminated transmitted light image (DB) of the specimen slide (OT), providing an incident light image (AB) of the specimen slide (OT), which is configured to reproduce the optical identifiers enough that they can be detected on the basis of the incident light image (AB) or so that respective spatial positions of the respective optical identifiers can be determined, providing a partially darkened transmitted light image (PDB3) of the specimen slide (OT), determining respective spatial positions (P1, P2, P3) of respective optical identifiers (KE1, KE2, KE3) on the basis of the incident light image (AB), determining respective spatial locations of the respective cover slip regions (DGB) on the basis of the partially darkened transmitted light image (PDB3), characterized by determining respective spatial locations of the respective tissue sections (GS, GS1, GS2, GS3) on the basis of the completely illuminated transmitted light image (PB), and assigning the respective tissue sections (GS, GS1, GS2, GS3) to the respective optical identifiers (KE1, KE2, KE3) on the basis of the respective spatial positions (P1, P2, P3) of the respective optical identifiers (KE1, KE2, KE3), on the basis of the respective spatial locations of the respective cover slip regions (DGB), and on the basis of the respective spatial locations of the respective tissue sections (GS, GS1, GS2, GS3).

9. A non-transitory computer readable storage medium, comprising commands which, upon execution by a computer, cause it to carry out the computer-implemented method as claimed in claim 8.

10. A computing unit for identifying respective cover slip regions (DGB) of respective cover slips having respective tissue sections (GS, GS1, GS2, GS3) on a specimen slide (OT), which has multiple optical identifiers (KE1, KE2, KE3), wherein the computing unit is designed to provide a completely illuminated transmitted light image (DB) of the specimen slide (OT), provide an incident light image (AB) of the specimen slide (OT), which is configured to reproduce the optical identifiers enough that they can be detected on the basis of the incident light image (AB) or so that respective spatial positions of the respective optical identifiers can be determined, provide a partially darkened transmitted light image (PDB3) of the specimen slide (OT), determine respective spatial positions (P1, P2, P3) of respective optical identifiers (KE1, KE2, KE3) on the basis of the incident light image (AB), determine respective spatial locations of the respective cover slip regions (DGB) on the basis of the partially darkened transmitted light image (PDB3), characterized by determine respective spatial locations of the respective tissue sections (GS, GS1, GS2, GS3) on the basis of the completely illuminated transmitted light image (PB), and assign the respective tissue sections (GS, GS1, GS2, GS3) to the respective optical identifiers (KE1, KE2, KE3) on the basis of the respective spatial positions (P1, P2, P3) of the respective optical identifiers (KE1, KE2, KE3), on the basis of the respective spatial locations of the respective cover slip regions (DGB), and on the basis of the respective spatial locations of the respective tissue sections (GS, GS1, GS2, GS3).

* * * * *